United States Patent [19]

Matsushima

[11] Patent Number: 5,217,017
[45] Date of Patent: Jun. 8, 1993

[54] ULTRASONIC RECEIVING APPARATUS

[75] Inventor: Tetsuya Matsushima, Kawasaki, Japan

[73] Assignee: Fujitsu Limited, Kawasaki, Japan

[21] Appl. No.: 904,970

[22] Filed: Jun. 26, 1992

[30] Foreign Application Priority Data

Jul. 2, 1991 [JP] Japan .................. 3-161916

[51] Int. Cl.⁵ .............................................. A61B 8/00
[52] U.S. Cl. ................................... 128/661.01; 73/625
[58] Field of Search .............. 128/660.07, 660.06, 128/661.01; 73/625, 626

[56] References Cited

U.S. PATENT DOCUMENTS

| | | | |
|---|---|---|---|
| 4,787,392 | 11/1988 | Saugeon | 128/661.01 |
| 5,088,496 | 2/1992 | Bernard | 128/660.07 |
| 5,143,075 | 9/1992 | Ishizuka | 128/661.01 |

Primary Examiner—Kyle L. Howell
Assistant Examiner—George Manuel
Attorney, Agent, or Firm—Staas & Halsey

[57] ABSTRACT

Disclosed is an ultrasonic receiving apparatus for use with an ultrasonic diagnosis system, the apparatus containing digital delaying means and/or digital adding means. The delaying means provides delays of sufficiently high accuracy using a clock signal of a reasonably high repeat frequency on a reasonable scale of circuit construction, while the adding means allows for larger probe aperture.

(1) The delaying means has delay circuits each offering a delay in units of the clock signal cycle, and infinitesimal delaying circuits each multiplying two signals derived from a single reception signal, one of the two signals being delayed relative to the other before the two are added.

(2) The adding means includes a sequential addition circuit having numerous adders and latch circuits connected alternately in cascade fashion, and numerous delay circuits for delaying each of reception signals by an integer multiple of the clock signal cycle for distribution to the adders so that the reception signals will be added after being input simultaneously to the adding means.

7 Claims, 19 Drawing Sheets

ULTRASONIC RECEIVING APPARATUS

BACKGROUND OF THE INVENTION

1. Field of the Invention

The present invention relates to an ultrasonic receiving apparatus for use with ultrasonic diagnosis systems and, more particularly, to an ultrasonic receiving apparatus suitable for high quality picture acquisition and having a low-cost digital reception beam former.

2. Description of the Related Art

Ultrasonic diagnosis systems have been in use for some years. These systems diagnose diseases of the internal organs in the human body by emitting ultrasonic waves thereto and by receiving what is reflected by the body's organ. Conventional ultrasonic diagnosis systems operate on the so-called dynamic focusing method. This method works as follows.

FIG. 16 is a schematic view of the relationship between a group of vibrators for emitting and receiving ultrasonic waves on the one hand, and ultrasonic reflecting points in the subject such as the human body on the other. FIG. 17 is a schematic view showing how the signals received by the vibrators are illustratively delayed for obtaining the information on points of ultrasonic reflection.

In both FIGS. 16 and 17, the horizontal direction is the direction in which n (e.g., 128) vibrators 1(1), 1(2), ..., 1(n) are laid out in contact with the surface of the subject body. The vertical axis of FIG. 16 represents the depths d of ultrasonic waves as they are emitted into and reflected from the subject body. The vertical axis of FIG. 17 represents the delay times D of delay circuits (to be described later) connected to the vibrators 1(1), 1(2), ..., 1(n). In this example, it is assumed that ultrasonic waves are reflected at points P1, P2 and P3 on a perpendicular extended from the center 0 of the vibrator group 1, as depicted in FIG. 16.

Where ultrasonic waves are reflected at point P1 having a depth of d1, the distance between point P1 and each of the vibrators 1(1), 1(2), ..., 1(n) increases the farther the vibrator is from the center 0 of the vibrator group 1. When the ultrasonic waves reflected at point P1 reach the two vibrators 1(1) and 1(n) at opposite ends of the vibrator group 1, the waves will have reached the points constituting a circular arc A1 around its center point P1 (assuming that the medium is uniform for the waves). Therefore, to obtain the information about point P1 based on the received ultrasonic waves requires delaying the signals received by the vibrators 1(1), 1(2), ..., 1(n) in the manner illustrated by a curve D1 in FIG. 17, before the signals are added up. Likewise, the ultrasonic waves are reflected at point P2 having a depth of d2 and at point P3 having a depth of d3. In this case, when the reflected waves reach the two vibrators 1(1) and 1(n) at opposite ends of the vibrator group 1, the waves will have reached the points constituting circular arcs A2 and A3 (also assuming that the medium is uniform for the waves). Thus the information about points P2 and P3 is obtained by delaying the signals received by the vibrators 1(1), 1(2), ..., 1(n) in the manner depicted by curves D2 and D3 in FIG. 17, before the signals are added. The deeper the point at which the ultrasonic waves are reflected, the longer it takes for the reflected waves to reach the vibrators 1(1), 1(2), ..., 1(n). Given this characteristic, the delay times D of the signals received by these vibrators are varied illustratively from D1 to D2 to D3 before the signals are added. This causes the ultrasonic focal point to move successively from point P1 to point P2 to point P3 inside the subject body. It is in the above manner that the dynamic focusing method is implemented.

FIG. 18 is a circuit block diagram of a conventional ultrasonic diagnosis system that operates on the dynamic focusing method using a digital circuit arrangement. In FIG. 18, a clock generation circuit 2 generates a clock signal CK having a predetermined cycle T and supplies it to a control circuit 3. The other component circuits operate in synchronism with the clock signal CK under control of the control circuit 3.

The vibrators 1(1), 1(2), ..., 1(n) constituting the vibrator group 1 are connected with emission drivers 4(1), 4(2), ..., 4(n) forming an emission driver group 4. During ultrasonic emission, the control circuit 3 sends timing pulses to the emission drivers 4(1), 4(2), ..., 4(n). In turn, the emission drivers convert the timing pulses they received into high-voltage pulses and supply them to the vibrators 1(1), 1(2), ..., 1(n). The high-voltage pulses cause the vibrators to emit pulse type ultrasonic waves into the subject body, not shown.

The vibrators 1(1), 1(2), ..., 1(n) are also connected with A/D (analog to digital) converters 5(1), 5(2), ..., 5(n) constituting an A/D converter group 5. Analog reception signals SA1, SA2, ..., SAn received by the vibrators 1(1), 1(2), ..., 1(n) are converted from analog to digital format by the A/D converters 5(1), 5(2), ..., 5(n). After A/D conversion, the signals turn into digital reception signals SD1, SD2, ..., SDn each comprising d bits (e.g., 8 bits).

The A/D converters 5(.1), 5(2), ..., 5(n) are connected to delay circuits 6(1), 6(2), ..., 6(n) constituting a delay circuit group 6. The digital reception signals SD1, SD2, ..., SDn output by the A/D converters 5(1), 5(2), ..., 5(n) are input to the respective delay circuits 6(1), 6(2), ..., 6(n) for delay operations of predetermined times. The delay times of these delay circuits are controlled by delay control signals SC1, SC2, ..., SCn transmitted from the control circuit 3. The delay circuits 6(1), 6(2), ..., 6(n), output respective delayed digital reception signals SDD1, SDD2, ..., SDDn which in turn are input to an adder 7. The add operation by the adder 7 produces an image display signal SI.

The conventional ultrasonic diagnosis system of the above construction produces the image display signal SI when controlled as follows.

During ultrasonic emission, ultrasonic waves are illustratively focused first on point P2 in the subject body as shown in FIG. 16. The focusing is achieved by the control circuit 3 sending appropriate timing pulses to the emission drivers 4(1), 4(2), ..., 4(n). The timing pulses cause the emission drivers to activate the respective vibrators 1(1), 1(2), ..., 1(n) with the timings progressively delayed the farther the vibrator is from the center 0 of the vibrator group 1 in accordance with the delay times D indicated by the curve D2 in FIG. 17.

The emitted ultrasonic beam is reflected inside the subject body at points where acoustic impedance is unmatched, and returns to the vibrator group 1. The reflected ultrasonic waves are received by the individual vibrators 1(1), 1(2), ..., 1(n). The received waves are converted by the A/D converters 5(1), 5(2), ..., 5(n) into the digital reception signals SD1, SD2, ..., SDn for input to the delay circuits 6(1), 6(2), ..., 6(n). These delay circuits output the delayed digital signals SDD1, SDD2, ..., SDDn. The delay times are chronologically varied as shown in FIG. 17, from the delay pattern D1 to D2 to D3, so that the focal point of ultrasonic reception shifts from point P1 to P2 to P3, as depicted in FIG. 16. After being output, the delayed digital signals SDD1, SDD2, ..., SDDn are added by the adder 7. In this manner, the dynamic focusing is implemented in a high resolution ultrasonic diagnosis system.

FIG. 19 is a block diagram of the delay circuit 6(1), one of the circuits constituting the delay circuit group 6 of FIG. 18. The same construction applies to the other delay circuits 6(2), 6(3), ..., 6(n).

The digital reception signal SD1 made of d (e.g., bits (S0, S1, ..., Sd) is generated by the A/D converter 5(1) of FIG. 18. This signal is input to the first 8(1) of m shift registers of d bits long each, the registers constituting the delay circuit 6(1). The shift registers 8 are driven by the clock signal CK generated by the clock generation circuit 2 of FIG. 18. Every time a cycle T of the clock signal CK elapses, the digital reception signal SD1 is shifted to the next shift register 8. The outputs of the shift registers 8(1), 8(2), ..., 8(m) are connected respectively to tri-state buffers 10(1), 10(2), ..., 10(n) of d bits each, the buffers forming a tri-state buffer group 10. In turn, the outputs of the tri-state buffers 10(1), 10(2), ..., 10(n) are interconnected before they are connected to the adder 7 of FIG. 18. Each of the tri-state buffers 10(1), 10(2), ... 10(n) operates in one of two modes. In the first mode, a d-bit signal whose pattern is made of 1's and 0's input to the buffer is output therefrom unchanged. In the second mode, the output of the buffer is held at the high impedance level. A decoder 9 is connected to the tri-state buffers 10(1), 10(2), ..., 10(n). This decoder 9 decodes the delay control signal SC1 coming from the control circuit 3 of FIG. 18. By so doing, the decoder 9 places one of the m tri-state buffers 10(1), 10(2), ..., 10(n) in the first mode and puts the remaining tri-state buffers in the second mode. In this manner, the delay circuit 6(1) outputs to the adder 7 a digital reception signal SDD1 delayed by an integer multiple of the cycle T, the delay cycle count being determined by which of the tri-state buffers 10(1), 10(2), ..., 10(n) is placed in the first mode. In each of the delay circuits 6(1), 6(2), ..., 6(n) making up the delay circuit group 6 of FIG. 18, each of the digital reception signals SD1, SD2, ..., SDn input to these circuits is delayed so as to implement the above-mentioned dynamic focusing method. The digital reception signals SDD1, SDD2, ..., SDDn coming from the delay circuits 6(1), 6(2), ..., 6(n) are added by the adder 7 as described. This results in the output of the signal SI corresponding to a single scanning line on a monitor screen. When the above signal receiving process is repeated while the ultrasonic beam is being emitted successively in different directions, a two-dimensional tomographic view is formed on the monitor screen.

To meet the requirements of lower costs and higher quality picture acquisition of recent years, the ultrasonic diagnosis system that performs the above-described digital processing must address two problems: the problem of how accurate delay times should be in implementing the dynamic focusing, and the problem of how to construct a viable adder for adding numerous digital reception signals.

The problem of delay time accuracy will now be described. FIG. 20 is a schematic view of ultrasonic reception signals. The analog signals SA1, A2, ..., SAn are obtained by the vibrators 1(1), 1(2), ... 1(n) (see FIG. 18) which receive ultrasonic waves reflected from inside the subject body. These analog reception signals are not single pulse signals but substantially sine wave signals with a center frequency of M (e.g., 3.5 MHz) and having pulse type envelopes, as shown in FIG. 20. In FIG. 20, the signal (a) is a signal received by the centrally located vibrator of t e vibrator group 1, and the signal (b) is received by the vibrator located at either end of the vibrator group. Small circles in the waveforms represent points sampled at intervals of cycle T. In this setup, the delay circuit group 6 of FIG. 18 delays by an integer multiple of cycle T (e.g., 4 cycles) the signal (a) received by the centrally located vibrator, in order to generate the signal (c). The signals (b) and (c) are then added up.

At this point, adding the signals of FIG. 20 requires matching closely their envelopes EN1 and EN2 and synchronizing the respective phase of the more or less sine wave signals SS1 and SS2. If the signals are added out of phase, the result of the addition is not meaningful. Experiments and experience have shown that the phase accuracy in that case should be within ±22.5°. This means that to attain the necessary time delays using the delay circuits 6(1), 6(2), ..., 6(n) of FIG. 18 with respect to the above degree of accuracy requires having the A/D converters 5(1), 5(2), ..., 5(n) perform sampling at intervals of a cycle one eighth or less of one M-th or less of the center frequency M. That is, the repeat frequency f of the clock signal CK should be at least eight times the center frequency M of the signals SS1 and SS2. Today, the ever-increasing needs for higher quality pictures are being met by ultrasonic diagnosis systems using higher ultrasonic frequencies. Some systems utilize ultrasonic probes of as high as 5 MHz and 7.5 MHz in frequency. The use of the 5 MHz and 7.5 MHz probes with ultrasonic diagnosis systems calls for high frequency clock signals CK of 40 MHz and 60 MHz, respectively. The received signals have each a dynamic range of at least 40 dB, the range varying somewhat depending on the intensity of reflectance at various points of reflection in the subject body. Thus to obtain a tomogram requires the use of a signal of at least 8 bits per point of reflection. The above process involves employing high-speed high-resolution A/D converters and high-speed circuits for adding digitized reception signals for delay. Because of their scale and speed requirements, these circuits are too costly to gain widespread acceptance in ultrasonic diagnosis systems.

One prior art solution to the above difficulty is as follows. Sampling is performed by use of a clock signal CK having a repeat frequency about double the highest frequency on the reception signal band (e.g., 7.5 MHz to 10 MHz for the center frequency of 5 MHz). Points between the sampled points are interpolated from the signal corresponding to each sampled point. The signals obtained by interpolation are also regarded as reception signals. The signals are then added up so that the phase matching accuracy between signals will fall within the range of ±22.5° for delay. One disadvantage of this solution is that the use of primary interpolation calculations aimed at high-speed processing entails too low levels of interpolation accuracy, while secondary or higher degrees of interpolation calculations if adopted involve complex computations that require high-speed processing. These requirements call for a vastly enlarged scale of circuitry.

Another prior art solution to the above difficulty is proposed in Japanese Patent Laid-Open No. 1-31151. This solution involves first using a clock signal CK about double the highest frequency on the reception signal band. Each of the vibrators 1(1), 1(2), ..., 1(n) is connected with two A/D converters. The two A/D converters are shifted from each other in sampling timing by a phase difference of 90 degrees relative to the center frequency of the reception signal. One disadvantage of this solution is that each vibrator needs two A/D converters, two delay circuits and two adders, in addition to such arithmetic circuits as multipliers and switchers. That is, the scale of the circuits involved will have to be at least doubled.

Another difficulty with conventional ultrasonic diagnosis systems is the ever-increasing complexity of the adder in its circuit construction. In recent years, the need for higher quality pictures has necessitated not only the adoption of high frequency ultrasonic waves but also the use of larger aperture of ultrasonic probes. In some systems, the number of vibrators can be as large as 128. In that case, a logic circuit arrangement for adding 128 digital reception signals all at once would be very complicated indeed. Such logic circuits are difficult to implement because of their scale and of the long operation times involved.

SUMMARY OF THE INVENTION

It is therefore a first object of the present invention to provide an ultrasonic receiving apparatus having digital delaying mean for performing delay operations at sufficiently high levels of accuracy using a clock signal of a suitable repeat frequency on a suitable scale of circuitry construction.

It is a second object of the invention to provide an ultrasonic receiving apparatus having digital adding means suitable for larger probe aperture.

In achieving the foregoing and other objects of the invention and according to a first and a second aspect thereof, there is provided an ultrasonic receiving apparatus comprising:

(1) a plurality of vibrators arranged in a predetermined direction for emitting ultrasonic waves into a subject body and receiving reflected ultrasonic waves therefrom so as to obtain analog reception signals;

(2) a clock generation circuit for generating a clock signal of a predetermined cycle;

(3) a plurality of A/D converters for receiving the analog reception signals from the large number of vibrators, for converting these signals to digital reception signals at intervals of the predetermined cycle, and for outputting the digital reception signals;

(4) a plurality of delaying means for delaying the digital reception signals so as to output substantially simultaneously the digital reception signals representing the ultrasonic waves reflected substantially simultaneously at approximately the same point in the subject body; and (5) adding means for adding the digital reception signals coming from the delaying means.

In achieving the first object of the invention, the ultrasonic receiving apparatus according to the first aspect thereof has each of the delaying means of (4) above constituted by:

(6) a delay circuit for delaying a digital reception signal of the digital reception signals by an integer multiple of the clock signal cycle (similar to each of the delay circuits 6(1), 6(2), ..., 6(n) in FIG. 18); and (7) an infinitesimal delay circuit comprising:

(a) a multiplier for generating a multiplication signal through multiplication, by a first predetermined number, of the digital reception signal;

(b) a multiplication-delay circuit for generating a multiplication-delay signal through multiplication, by a second predetermined number, of the digital reception signal and through the delaying, by a predetermined time, of the digital reception signal; and (c) a signal adder for adding the multiplication signal from the multiplier of (a) above and the multiplication-delay signal from the multiplication-delay circuit of (b) above.

In the ultrasonic receiving apparatus according to the first aspect of the invention, the clock generation circuit preferably generates the clock signal of which the frequency is four times the center frequency of the analog reception signals, and the multiplication-delay circuit preferably multiplies the second of the two digital reception signals by a second predetermined number and further delays the second of the two digital reception signals by one cycle of the clock signal.

In achieving the second object of the invention, the ultrasonic receiving apparatus according to the second aspect thereof has the adding means of (5) constituted by:

(8) a sequential addition circuit having adders and latch circuits connected in cascade fashion so that an output signal from one adder is latched by the latch circuit immediately downstream which in turn outputs the latched result to the next ladder, and so on; and (9) a plurality of delay circuits for delaying each of the digital reception signals by an integer multiple of the clock signal cycle for distribution to the adders, in such a manner that the digital reception signals will be added after being output simultaneously by the delaying means of (4) above.

Each of the adders comprises at least one individual adder for adding at least two digital reception signals.

According to a third, a fourth and a fifth aspect of the invention, there is provided an ultrasonic receiving apparatus including the vibrators of (1) above, the clock generation circuit of (2) and the A/D converters of (3), the apparatus further comprising:

(10) delaying-adding means for delaying individually the digital reception signals output by the A/D converters of (3) above so that the digital reception signals when added will represent the ultrasonic waves reflected substantially simultaneously at approximately the same point in the subject body.

The ultrasonic receiving apparatus according to the third aspect of the invention comprises the components of both the apparatus according to the first aspect thereof and the apparatus according to the second aspect thereof and achieves the first and the second objects thereof, wherein the delaying-adding means of (10) above includes:

(11) a plurality of delaying means having both the delaying circuits of (6) and the infinitesimal delay circuits of (7) contained in the ultrasonic receiving apparatus according to the first aspect of the invention; and

(12) adding means comprising the sequential addition circuit of (8) and the delay circuits of (9) contained in the ultrasonic receiving apparatus according to the second aspect of the invention.

In achieving the second object of the invention, the ultrasonic receiving apparatus according to the fourth aspect thereof includes the vibrators of (1) above, the clock generation circuit of (2), the A/D converters of (3) and the delaying-adding means of (10), the delaying-adding means further comprising:

(13) a first and a second display correction delay circuit for delaying each input signal by an integer multiple of the clock signal cycle;

(14) an adder for adding output signals from the first and the second display correction delay circuits;

(15) a plurality of unit addition delay circuits corresponding to the vibrators of (1) above except for the two vibrators at both ends of the vibrator group, each of the unit addition delay circuits comprising:

(a) an adder for receiving a digital reception signal;

(b) a delay circuit for latching an output signal from the adder of (a) above for delay by an integer multiple of the clock signal cycle so as to allow the adder immediately downstream of the adder of (a) to add up the digital reception signals representing the ultrasonic waves reflected substantially simultaneously at approximately the same point in the subject body; and (c) a switcher for switching an output signal from the delay circuit of (b) above to one of the two adders corresponding to the two vibrators adjacent to each vibrator;

(16) a unit addition delay circuit provided for the first of the two vibrators located at both ends of the group of the large number of vibrators of (1) above, the unit addition delay circuit comprising:

(a) an adder for receiving a digital reception signal;

(b) a delay circuit for latching an output signal from the adder of (a) above for delay by an integer multiple of the clock signal cycle so as to allow the adder immediately downstream of the adder of (a) to add up the digital reception signals representing the ultrasonic waves reflected substantially simultaneously at approximately the same point in the subject body; and (c) a switcher for switching an output signal from the delay circuit of (b) above to one of two destinations, one destination being the first of the two vibrators, the other destination being the first display correction delay circuit;

(17) a unit addition delay circuit provided for the second of the two vibrators located at both ends of the group of the vibrators of (1) above, the unit addition delay circuit comprising:

(a) an adder for receiving a digital reception signal;

(b) a delay circuit for latching an output signal from the adder of (a) above for delay by an integer multiple of the clock signal cycle so as to allow the adder immediately downstream of the adder of (a) to add up the digital reception signals representing the ultrasonic waves reflected substantially simultaneously at approximately the same point in the subject body; and (c) a switcher for switching an output signal from the delay circuit of (b) above to one of two destinations, one destination being the second of the two vibrators, the other destination being the second display correction delay circuit; and

(18) a plurality of correction delay circuits provided for each of the above unit addition delay circuits, the correction delay circuits delaying each digital reception signal by an integer multiple of the clock signal cycle for distribution to each of the adders so that the digital reception signals input simultaneously to the delaying-adding means will be added up when the delay times of the delay circuits are the same.

The ultrasonic receiving apparatus according to the fifth aspect of the invention includes the components of the apparatus according to the fourth aspect thereof, wherein the delaying-adding means of (10) has the infinitesimal delay circuit containing the parts of (a), (b) and (c) of (7), the infinitesimal delay circuit being positioned in one of two locations, one location being upstream of each correction delay circuit, the other location being downstream thereof. Constructed in this manner, the ultrasonic receiving apparatus achieves the first and the second objects of the invention.

Conventional received signal dynamic focusing techniques are based on analog signal processing. One prior art method for implementing the techniques involves furnishing a delay circuit arrangement made of a large number of inductances L and a large number of capacitors C connected in cascade fashion. Under this method, the delay time is varied by switching the location through which the reception signal is input to the delay circuit or through which the reception signal is output therefrom. One disadvantage of this method is that the switching operation entails large amounts of noise. One solution to this problem involves dividing each reception signal into two signals which are individually amplified with different gains, one of the signals being delayed relative to the other before the two signals are added. The delay time is varied by changing the gains (U.S. patent application No. 811,364, Japanese Utility Model Laid-Open No. 60-39822). This corrective method eliminates the need for the switching operation for delay time change and hence does away with the switching-induced noise. However, another problem arises out of this solution. That is, when dynamic focusing is performed over a long range from shallow to deep points in the subject body, the substantially sine wave reception signals SS1 and SS2 (FIG. 20) are matched in phase but the envelopes EN1 and EN2 are appreciably unmatched. As a result, delay-add operations are not correctly carried out.

Although the prior art digital delay circuit group of FIG. 18 provides infinitesimal delays only if it uses a high frequency clock signal CK, the circuit group has two advantages. One advantage is that the digital delay circuit group is not plagued by the noise problem attributable to analog delay circuits comprising inductances L and capacitors C. The other advantage is that when combined with the corrective method disclosed in Japanese Utility Model Laid-Open No. 60-39822 and others, the digital delay circuit group permits infinitesimal delays in infinitesimal delay regions. Given such advantages, the invention combines the conventional digital delay circuits such as those in FIG. 18 with the above-mentioned infinitesimal delay circuits for digital phase variation. The combination of these parts solves the problem of inadequate delay accuracy in digital delay processing.

The above method of digital phase variation will now be described in more detail. FIG. 1 is a schematic view of typical ultrasonic reception signals that are used to describe the signal delay method by phase variation. Signals (a), (b) and (c) of FIG. 1 are identical in waveform to those (a), (b) and (c) of FIG. 20. The signal (a) is received by the centrally located vibrator of the vibrator group 1 (FIG. 18), and the signal (b) by one of the two vibrators located at both ends of the group 1. The signal (c) is obtained by delaying the signal (a) four times the cycle T of the clock signal CK. Small circles in the waveforms represent points sampled at intervals of the cycle T.

As illustrated, the signal (c), which is the signal (a) delayed by four clock pulses, substantially matches the reception signal (b) in envelope (FIG. 20) but is out of phase with the substantially sine wave signal (b).

Since the signal (c) may be regarded partially as a sine wave signal having a center frequency of f, let the signal (c) be defined by $\cos\omega t$ ($\omega=2\pi f$). This signal is divided into two signals, one being multiplied by A and the other by B. After one of the two signals is delayed by a delay time of $\tau$ (one cycle T of the clock signal CK or a multiple thereof) relative to the other, the two signals are added. A signal Vout following the add operation is defined as follows:

$$Vout = A\cos(\omega t) + B\cos\{\omega(t-\tau)\} \quad (A)$$

By modifying the above equation, one gets:

$$\begin{aligned} Vout &= A\cos(\omega t) + B\{\cos(\omega t)\cos(\omega\tau) + \\ &\quad \sin(\omega t)\sin(\omega\tau)\} \\ &= \{A + B\cos(\omega\tau)\}\cos(\omega t) + \\ &\quad B\sin(\omega\tau)\sin(\omega t) \end{aligned} \quad (B)$$

If it is assumed that $$\cos(\phi) = A + B\cos(\omega\tau) \quad (C)$$

$$\sin(\phi) = B\sin(\omega\tau) \quad (D)$$

then from equation (B), one gets:

$$\begin{aligned} Vout &= \cos(\phi)\cos(\omega t) + \sin(\phi)\sin(\omega t) \\ &= \cos(\omega t - \phi) \end{aligned} \quad (E)$$

Thus the signal Vout is obtained by having the initial signal $\cos\omega t$ varied by $\phi$ in phase.

If the delay time is determined so that $$\sin(\omega\tau) \neq 0 \quad (F)$$

that is, $$\tau \neq k/2f \text{ (k=any integer)} \quad (G)$$

then from equations (C) and (D), one gets:

$$\begin{aligned} A &= \cos(\phi) - B\cos(\omega\tau) \\ &= \cos(\phi) - \sin(\phi)\cos(\omega\tau)/\sin(\omega\tau) \\ &= \{\sin(\omega\tau)\cos(\phi) - \sin(\phi)\cos(\omega\tau)\}/\sin(\omega\tau) \\ &= \sin(\omega\tau - \phi)/\sin(\omega\tau) \end{aligned} \quad (H)$$

$$B = \sin(\phi)/\sin(\omega\tau) \quad (I)$$

That is, the phase $\phi$ is inserted into equations (H) and (I) to find coefficients A and B. In turn, the initial signal $\cos(\omega t)$ is multiplied by the coefficients A and B. This provides the signal Vout = $\cos(\omega\tau - \phi)$ having an intermediate phase $\phi$ between the initial signal $\cos(\omega t)$ and the signal $\cos(\omega t - \tau)$ delayed by $\tau$.

Based on the principle described, the signal (d) is generated by varying the phase of the signal (c) in FIG. 1. The signal (d) matches the signal (b) in phase. Adding up these two signals produces the correctly composed signal (e).

Although the delay time $\tau$ may be an integer multiple of the cycle T of the clock signal CK, one clock signal cycle T is usually sufficient as the delay time $\tau$ for the infinitesimal delay circuits because the delay per cycle T is attained using a conventional delay circuit arrangement containing shift registers or their equivalent. Under constraints of the sampling theorem applied here, the frequency of the clock signal CK should be about four times the center frequency of reception signals (at least twice the highest frequency of the reception signal band), but need not be higher than that.

The ultrasonic receiving apparatus according to the first, the third and the fifth aspects of the invention has delaying means combining two delaying modes: delays in units of the cycle T of the clock signal CK, and infinitesimal delays based on the above-described principle. The apparatus of this construction provides delays of high precision without requiring a clock signal CK of higher speeds or without substantially enlarging the scope of the circuitry involved.

In place of the conventional shift register-based delay circuits (FIGS. 18, 19) for delays in units of the cycle T of the clock signal CK, the ultrasonic receiving apparatus according to the invention may use other delay circuits including those that control the timings for writing to and reading from internal memories.

The ultrasonic receiving apparatus according to the first aspect of the invention has a its object the delaying of high precision. The construction of the adding means for this apparatus, not described in detail so far, may be any construction as long as it allows the object to be accomplished. For example, the apparatus may adopt the adding means of the ultrasonic receiving apparatus according to the second aspect of the invention. This in fact provides the structure of the ultrasonic receiving apparatus according to the third aspect of the invention. Another example is a circuit construction that provides the following operations: Suppose that n digital reception signals SDD1, SDD2, ..., SDn (see FIG. 18) are to be added. In that case, at the first timing in synchronism with the clock signal CK, the operations of $$SDD11 = SDD1 + SDD2$$
$$SDD12 = SDD3 + SDD4$$
$$\vdots$$
$$SDD1p = SDDn - 1 + SDDn \ (P = n/2)$$

are carried out and the results thereof are latched. At the next timing, the operations of $$SDD21 = SDD11 + SDD12$$
$$\vdots$$
$$SDD2q = SDD1, p - 1' + SDD1p \ (q = p/2)$$

are carried out and the results are also latched. The process is repeated until the operation $$SDD1+SDD2+\ldots, +SDDn$$

is ultimately performed. Adding means of other constructions may also be utilized.

In addressing larger probe aperture, the ultrasonic receiving apparatus according to the second aspect of the invention comprises adding means suitable for adding up numerous (e.g., 128) digital reception signals. As described, the adding means of this apparatus includes the sequential addition circuit of (8) above and the large number of delay circuits of (9). The numerous digital reception signals are added sequentially by the sequential addition circuit while they are being adjusted in timing by the large number of delay circuits. Thus an ultrasonic receiving apparatus having a large aperture probe arrangement is still capable of adding up the digital reception signals with high efficiency. The adding means of this kind is advantageous in that it may combine, as an application of its operating principles, with delaying means to constitute the ultrasonic receiving apparatus according to the fourth aspect of the invention. This leads to the apparatus incorporating delaying-adding means of a smaller overall circuit scale.

The ultrasonic receiving apparatus according to the second aspect of the invention comprises the adding means both suitable for achieving the object of enlarging the probe aperture and capable of combining with delaying means. In contrast with the ultrasonic receiving apparatus according to the first aspect of the invention, the construction of the delay means of this apparatus, not described in detail so far, may be any construction as long as it allows the object of probe aperture enlargement to be accomplished. For example, the apparatus may adopt the delaying means of the ultrasonic receiving apparatus according to the first aspect of the invention. This actually provides the structure of the ultrasonic receiving apparatus according to the third aspect of the invention. Alternatively, the above-mentioned interpolation-based method may be adopted on condition that deterioration of accuracy and/or increase in signal processing time be tolerated to a certain extent. A further alternative is the method disclosed in Japanese Patent Laid-Open No. 1-31151, whereby a certain degree of increase in circuit scale is condoned while two A/D converters are provided per vibrator.

The ultrasonic receiving apparatus according to the third aspect of the invention combinedly connects two means, one being the delaying means of the apparatus according to the first aspect of the invention, the other being the adding means of the apparatus according to the second aspect thereof. Thus the apparatus according to the third aspect of the invention is suitable both for improving delay accuracy and for enlarging the probe aperture.

The ultrasonic receiving apparatus according to the fourth aspect of the invention includes the first and the second display correction delay circuits of (13) above, the adder of (14), the large number of unit addition delay circuits of (15), (16) and (17), and the large number of correction delay circuits of (18). Thus as with the apparatus according to the second aspect of the invention, the apparatus according to the fourth aspect thereof carries out the add operations suitable for probe aperture enlargement. Furthermore, the latter apparatus implements dynamic focusing on a smaller overall circuit scale wherein add and delay operations are organically combined.

The ultrasonic receiving apparatus according to the fifth aspect of the invention is an apparatus according to the fourth aspect thereof supplemented by the infinitesimal delay circuits of the apparatus according to the first aspect thereof. Specifically, the infinitesimal delay circuit made of the parts of (a), (b) and (c) in (7) above is provided in one of two locations, one location being upstream of each correction delay circuit of (18), the other location being downstream thereof. Thus as with the ultrasonic receiving apparatus according to the third aspect of the invention, the apparatus according to the fifth aspect thereof is suitable both for delay accuracy enhancement and for probe aperture enlargement. Furthermore, as with the ultrasonic receiving apparatus according to the fourth aspect of the invention, the apparatus according to the fifth aspect thereof implements dynamic focusing on a smaller overall circuit scale wherein add and delay operations are organically combined.

As described above the ultrasonic receiving apparatus according to the first aspect of the invention has a large number of delaying means each constituted by: a delay circuit for delaying in units of the clock signal cycle; and an infinitesimal delay circuit comprising: a multiplier for generating a multiplication signal through multiplication, by a first predetermined number, of the first of two digital reception signals derived from a single digital reception signal; a multiplication-delay circuit for generating a multiplication-delay signal through multiplication, by a second predetermined number, of the second of the two digital reception signals and through the delaying, by a predetermined time, of the second of the same two digital reception signals; and a signal adder for adding the multiplication signal and the multiplication-delay signal. With this apparatus, the frequency of the clock signal may illustratively be as low as about four times the frequency of reception signals or about twice the highest frequency of the reception signal band. Delay operations of sufficiently high accuracy are achieved without substantially enlarging the scope of the circuits involved. With the multiplication-delay circuit, delaying a digital signal by one clock signal cycle is sufficient.

The ultrasonic receiving apparatus according to the second aspect of the invention has adding means comprising: a sequential addition circuit having adders and latch circuits connected in cascade fashion; and a large number of delay circuits for delaying each digital reception signal by an integer multiple of the clock signal cycle for distribution to the adders, so as to add up the digital reception signals that are input simultaneously. By permitting the use of a large aperture probe arrangement, this apparatus carries out highly efficient add operations when numerous reception signals are to be added.

The ultrasonic receiving apparatus according to the third aspect of the invention includes delaying-adding means comprising the delaying means of the apparatus according to the first aspect of the invention as well as the adding means of the apparatus according to the second aspect thereof. This apparatus provides delay operations of sufficiently high precision without recourse to an unduly high clock signal frequency (i.e., circuit operation speed), as in the case of the apparatus according to the first aspect of the invention, and also carries out add operations suitable for large probe aperture, as in the case of the apparatus according to the second aspect of the invention.

The ultrasonic receiving apparatus according to the fourth aspect of the invention includes delaying-adding means comprising: a first and a second display correction delay circuit for delaying each input signal by an integer multiple of the clock signal cycle; an adder for adding output signals from the first and the second display correction delay circuits; a large number of unit addition delay circuits corresponding to a large number of vibrators, each of the unit addition delay circuits including an adder, a delay circuit and a switcher; and a large number of correction delay circuits provided for each of the above unit addition delay circuits, the correction delay circuits delaying each input digital reception signal by an integer multiple of the clock signal cycle for distribution to each of the large number of adders. This apparatus combines organically the concept of the adding means in the apparatus according to the first aspect of the invention, with the delaying means for delays in units of the clock signal cycle. The resulting apparatus has a reduced overall circuit scale at low cost and is suitable for addressing large probe aperture.

The ultrasonic receiving apparatus according to the fifth aspect of the invention which includes the components of the apparatus according to the fourth aspect thereof further comprises the infinitesimal delay circuit contained in the apparatus according to the first aspect of the invention. This apparatus promises delay operations of sufficiently high accuracy and addresses large probe aperture using the clock signal of a reasonably high frequency on a reasonable circuit scope. That is, the apparatus meets the requirements both for high quality picture acquisition and for appreciable cost reductions while the circuitry of the apparatus is conducive to large scale integration (LSI).

These and other objects, features and advantages of the invention will become more apparent upon a reading of the following description and appended drawings.

DESCRIPTION OF THE PREFERRED EMBODIMENTS

Preferred embodiments of the invention will now be described with reference to the accompanying drawings.

Figure 1:
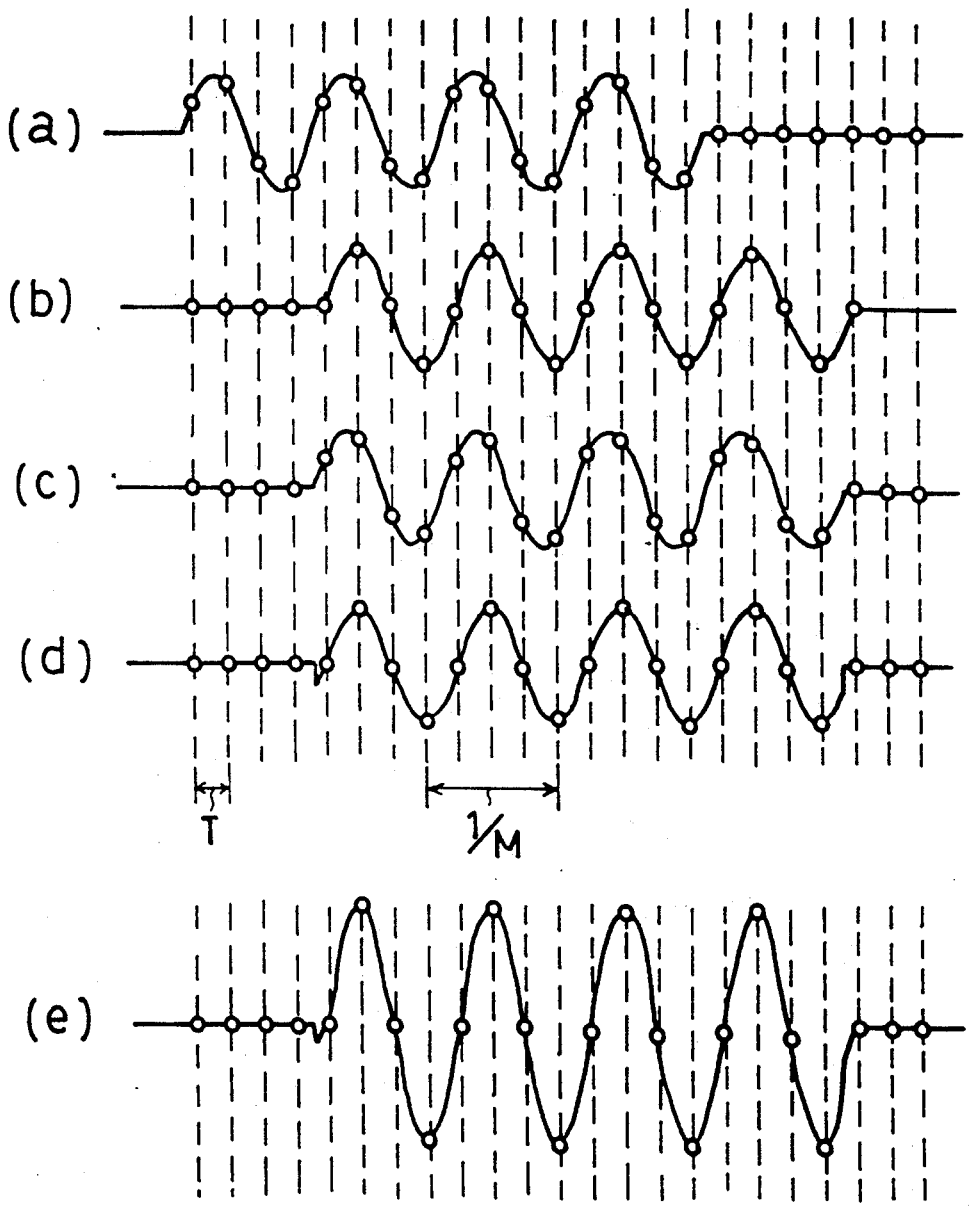
FIG. 1 is a schematic view of typical ultrasonic reception signals.
Figure 2:
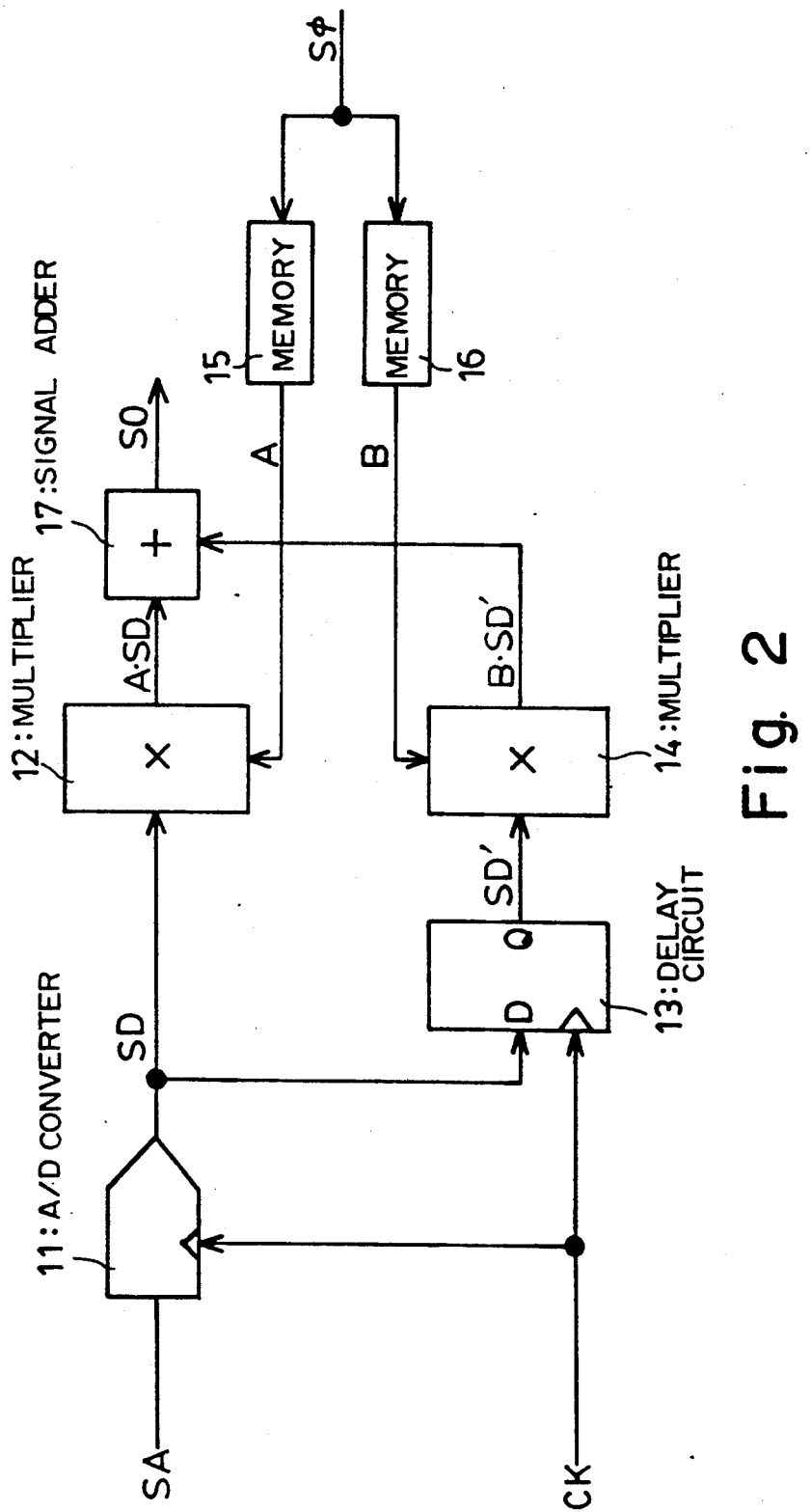
FIG. 2 is a block diagram of an infinitesimal delay circuit in connection with the invention.
Figure 3:
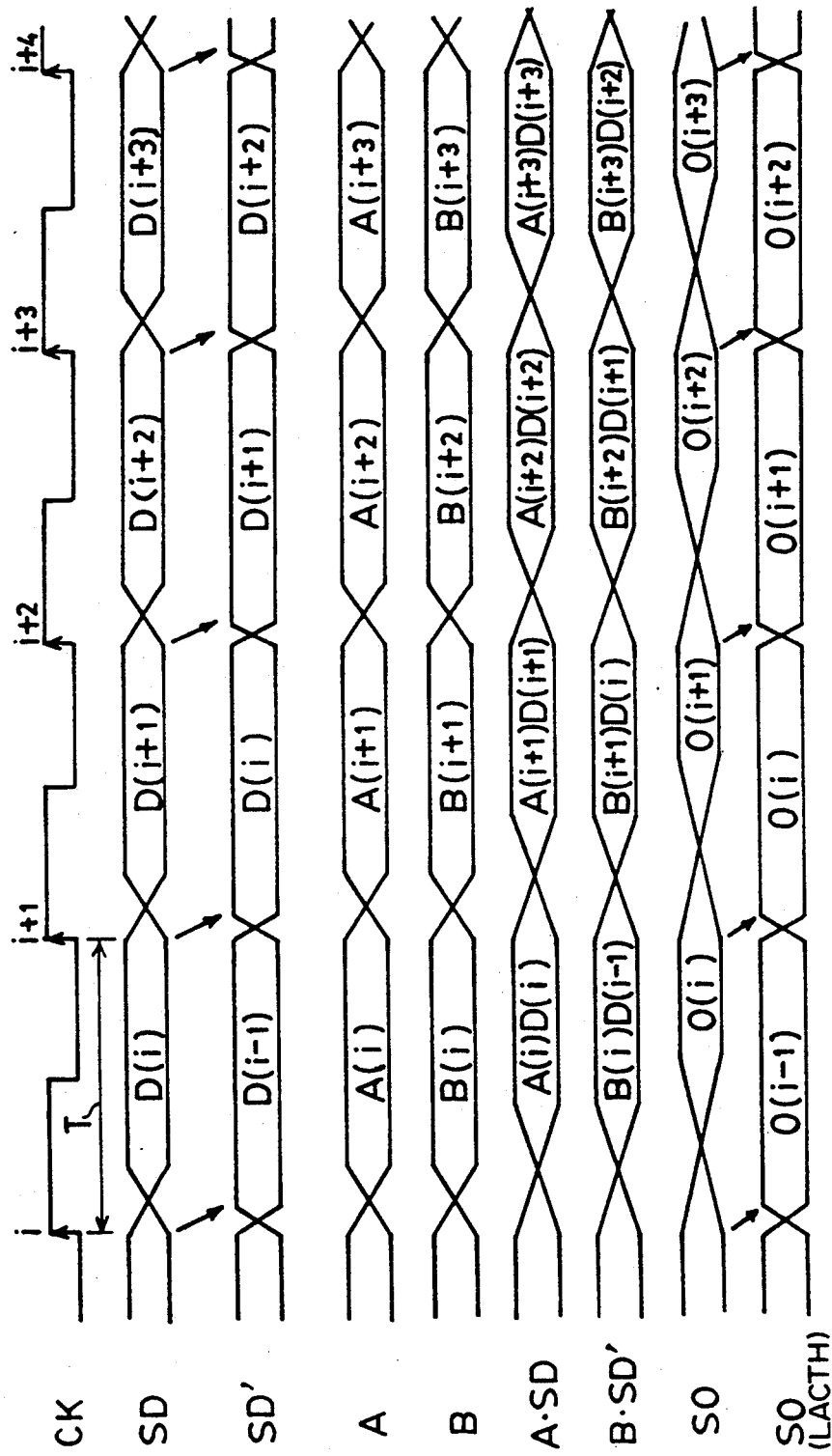
FIG. 3 is a timing chart for the infinitesimal delay circuit of FIG. 2.

FIG. 2 is a circuit block diagram of an infinitesimal delay circuit for use with a first, a third and a fifth embodiment of the invention. FIG. 3 is a timing chart for the infinitesimal delay circuit of FIG. 2.

Referring to FIG. 2, an A/D converter 11 receives an analog reception signal SA and a clock signal CK having a predetermined cycle T (see FIG. 3). The analog reception signal SA is obtained by the vibrator, not shown, which corresponds to the A/D converter 11. At each leading edge of the pulses constituting the clock signal CK, the analog reception signal SA is sampled and turned into a digital reception signal SD. As shown in FIG. 3, the digital reception signal SD sampled at the leading edge of a pulse i of the clock signal CK is identified by D(i). The digital reception signal SD is divided into two signals, one being input to a multiplier 12 and the other to a delay circuit 13. The delay circuit 13, also receiving the clock signal CK, delays the input digital reception signal SD by one clock pulse (cycle T) and outputs a delayed digital signal SD'. The digital signal SD' is input to a multiplier 14. In this example, the combination of the delay circuit 13 and the multiplier 14 constitutes the multiplication-delay circuit of the invention.

A control circuit, not shown, supplies memories 15 and 16 with a control signal S$\phi$ representing a phase delay amount $\phi$ (from equation (E) above). The memories 15 and 16 store, in the form of a look-up table, the correspondence between the phase amount $\phi$ on the one hand, and the values A and B (from equations (H) and (I) above) by which to multiply the digital reception signals SD and SD' input to the multipliers 12 and 14 on the other.

In response to the input control signal S$\phi$, the memories 15 and 16 output the values A and B in synchronism with the clock signal CK. The values A and B are input to the multipliers 12 and 14, respectively. The multipliers 12 and 14 multiply the input digital reception signals SD and SD' by the values A and B, respectively. After multiplication, the multipliers 12 and 14 output signals A·SD and B·SD' which are input to a signal adder 17. The signal adder 17 adds the received signals and outputs a signal SO. The signal SO, obtained by infinitesimally delaying the digital reception signal SD to a suitable degree, is input to a latch circuit, not shown.

The phase amount $\phi$ represented by the control signal S$\phi$ is typically related to the multiplication coefficients A and B as follows. Suppose that the center frequency f of the reception signal is 5.0 MHz and that the maximum frequency of the reception signal band is 10 MHz or less. Under these conditions, further suppose that the repeat frequency 1/T of the clock signal CK is set to 20 MHz, i.e., four times the center frequency f (about twice the maximum band frequency). In this example, the delay circuit 13 provides a single lock pulse delay, with the result that the delay time $\tau$ is 50 nsec. At this point, $2\pi f\tau = \omega\tau = \pi/2$ (90°). Thus from equations (H) and (I), one gets:

$$A = \cos(\phi) \quad (J)$$

$$B = \sin(\phi) \quad ((K)$$

Under the above conditions, the relationships between the phase amount $\phi$ defined by equations (J) and (K) on the one hand, and the coefficients A and B on the other, are stored beforehand as a look-up table in the memories 15 and 16.

In another example, suppose that the center frequency f of the reception signal is 7.5 MHz and that the maximum frequency of the reception signal band is 10 MHz or less. Under these conditions, further suppose that the repeat frequency 1/T of the clock signal CK is set to 20 MHz, i.e., the same as with the above example. In this case, $\omega\tau = 3\pi/4$ (135°). Thus from equations (H) and (I), one gets:

$$A = 2^{\frac{1}{2}} \sin(3\pi/4 - \phi) \quad (L)$$

$$B = 2^{\frac{1}{2}} \sin(\phi) \quad (M)$$

In this case, the relationships between the phase amount $\phi$ defined by equations (L) and (M) on the one hand, and the coefficients A and B on the other, are stored beforehand as a look-up table in the memories 15 and 16.

As described, the infinitesimal delay circuit arrangement is implement under the following conditions: that the frequency of the clock signal CK is to be four times the center frequency f of the reception signal or about twice the maximum frequency of the reception signal band, and that the frequency of the clock signal CK and the delay clock count for the delay circuit 13 are to be set so as to satisfy the above equation (G). The invention combines the infinitesimal delay circuit arrangement with another delay circuit arrangement for delays in units of the cycle T of the clock signal CK. This provides delays of sufficiently high accuracy over a long range within the subject body while the frequency of the clock signal CK is kept four times the center frequency f of the reception signal or about twice the maximum frequency of the reception signal band.

The delay accuracy required here is within ±22.5° relative to the center frequency of the reception signal, as mentioned. It follows that the phase amount $\phi$ represented by the control signal S$\phi$ may occur at intervals of 45°. For example, if the center frequency f is 5.0 MHz, the phase amounts may be 0° and 45°; if the center frequency f is 7.5 MHz, the phase amounts may be 0°, 45° and 90°. When the memories 15 and 16 are furnished to accommodate the coefficients A and B obtained using equations (J) and (K) or equations (L) and (M), these memories may double as arithmetic circuits for performing arithmetic operations on these equations.

Figure 4:
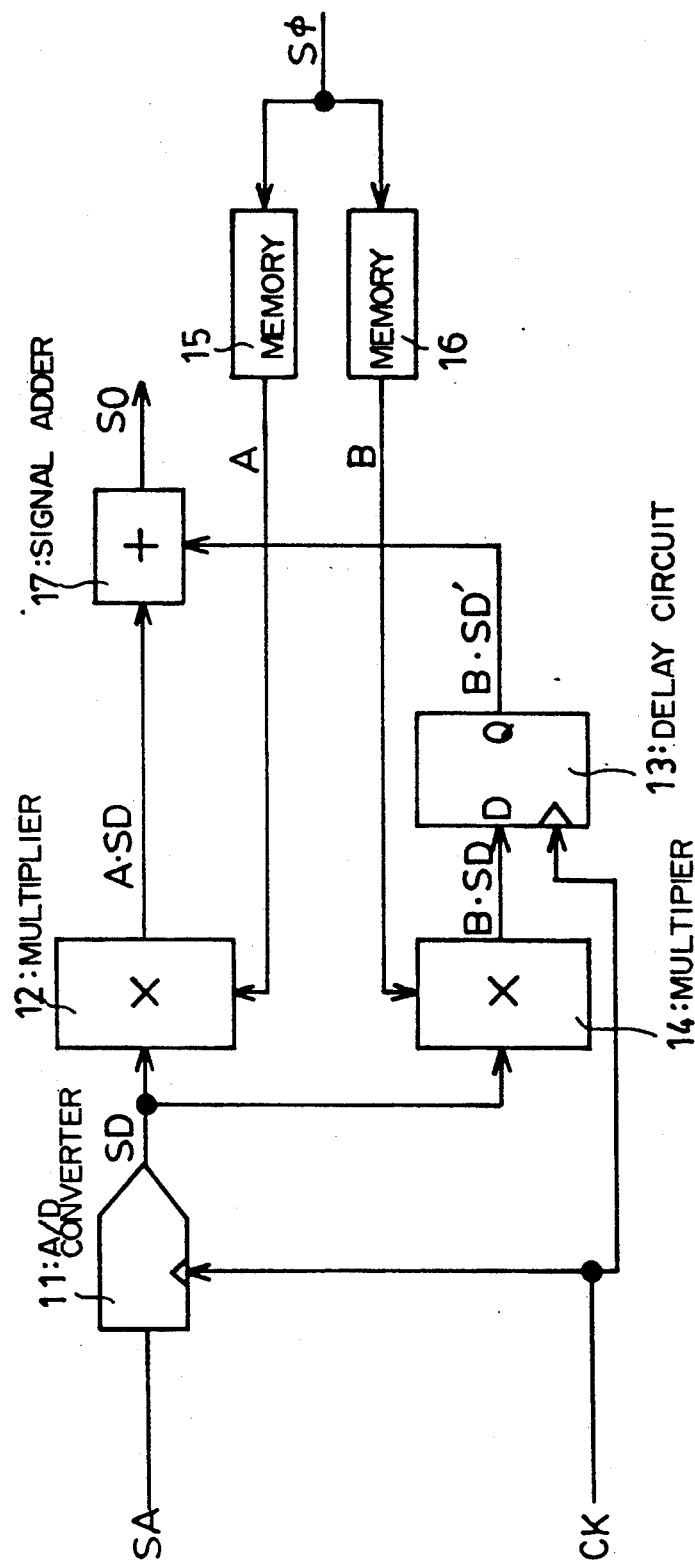
FIG. 4 is a block diagram of another infinitesimal delay circuit in connection with the invention.
Figure 5:
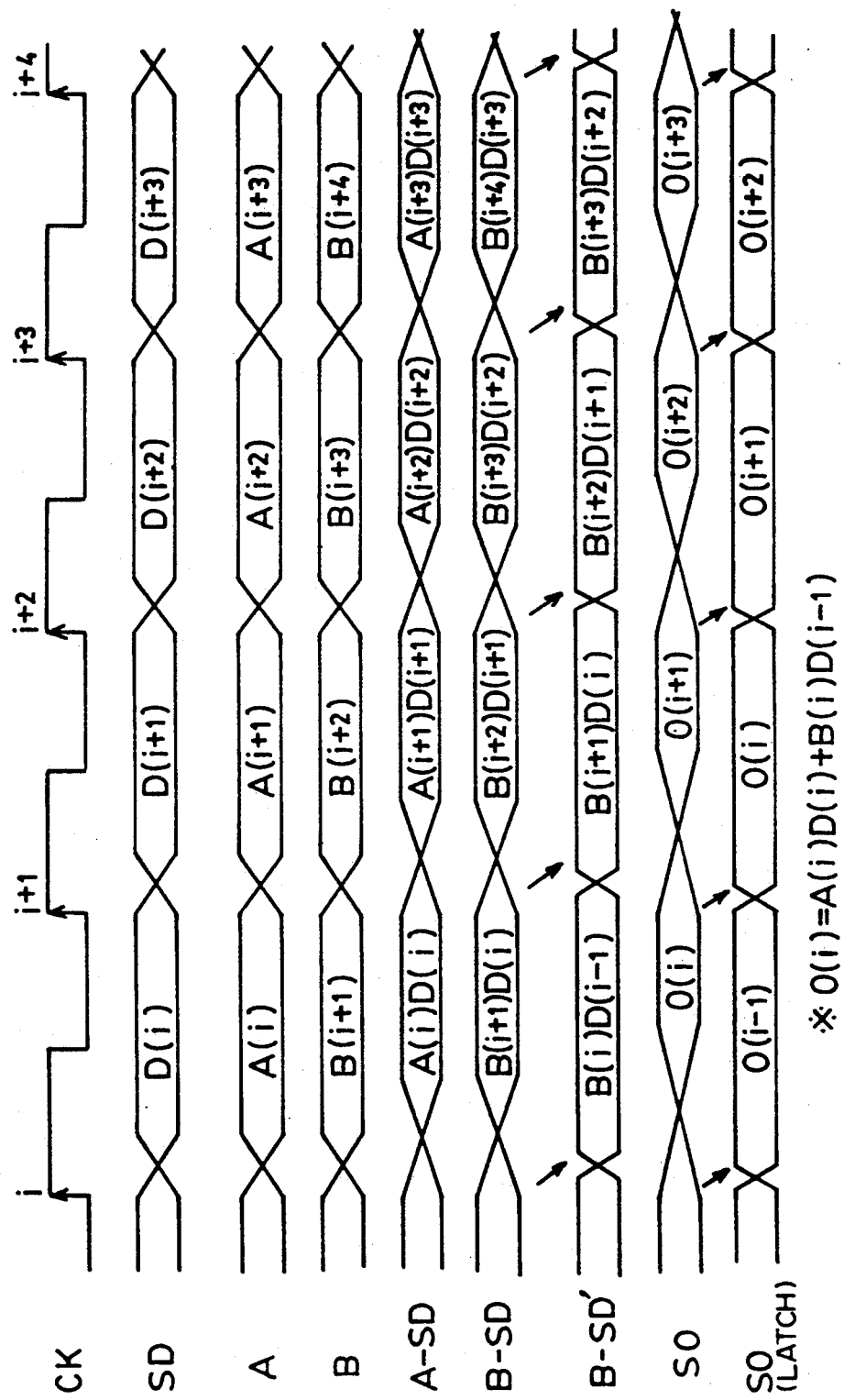
FIG. 5 is a timing chart for the infinitesimal delay circuit of FIG. 4.

FIG. 4 is a block diagram of another infinitesimal delay circuit in connection with the invention. In FIG. 4 as well as in FIG. 2, like reference characters designate like or corresponding parts, and any repetitive description thereof will be omitted. FIG. 5 is a timing chart for the infinitesimal delay circuit of FIG. 4.

Comparing FIG. 4 with FIG. 2 reveals that the locations of the delay circuits 13 and 14 are switched between the two infinitesimal delay circuits. As a result of this, the timing of the coefficient B in FIG. 4 shifts by one clock pulse, as shown in the timing chart of FIG. 5. However, regardless of either the delay circuit 13 or the circuit 14 being placed upstream of the other circuit, the infinitesimal delay circuit is still implemented.

Figure 6:
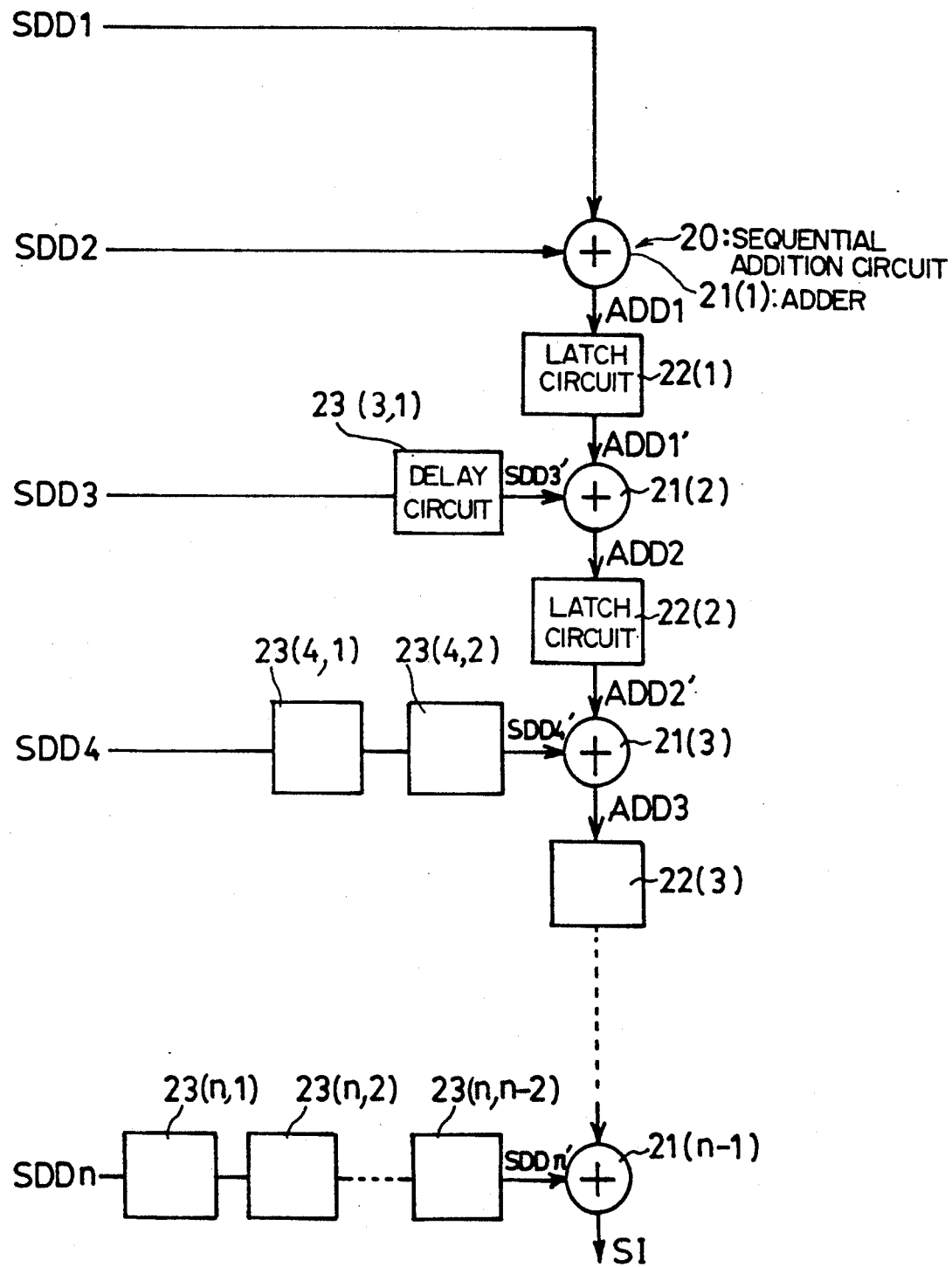
FIG. 6 is a block diagram of adding means in connection with the invention.
Figure 7:
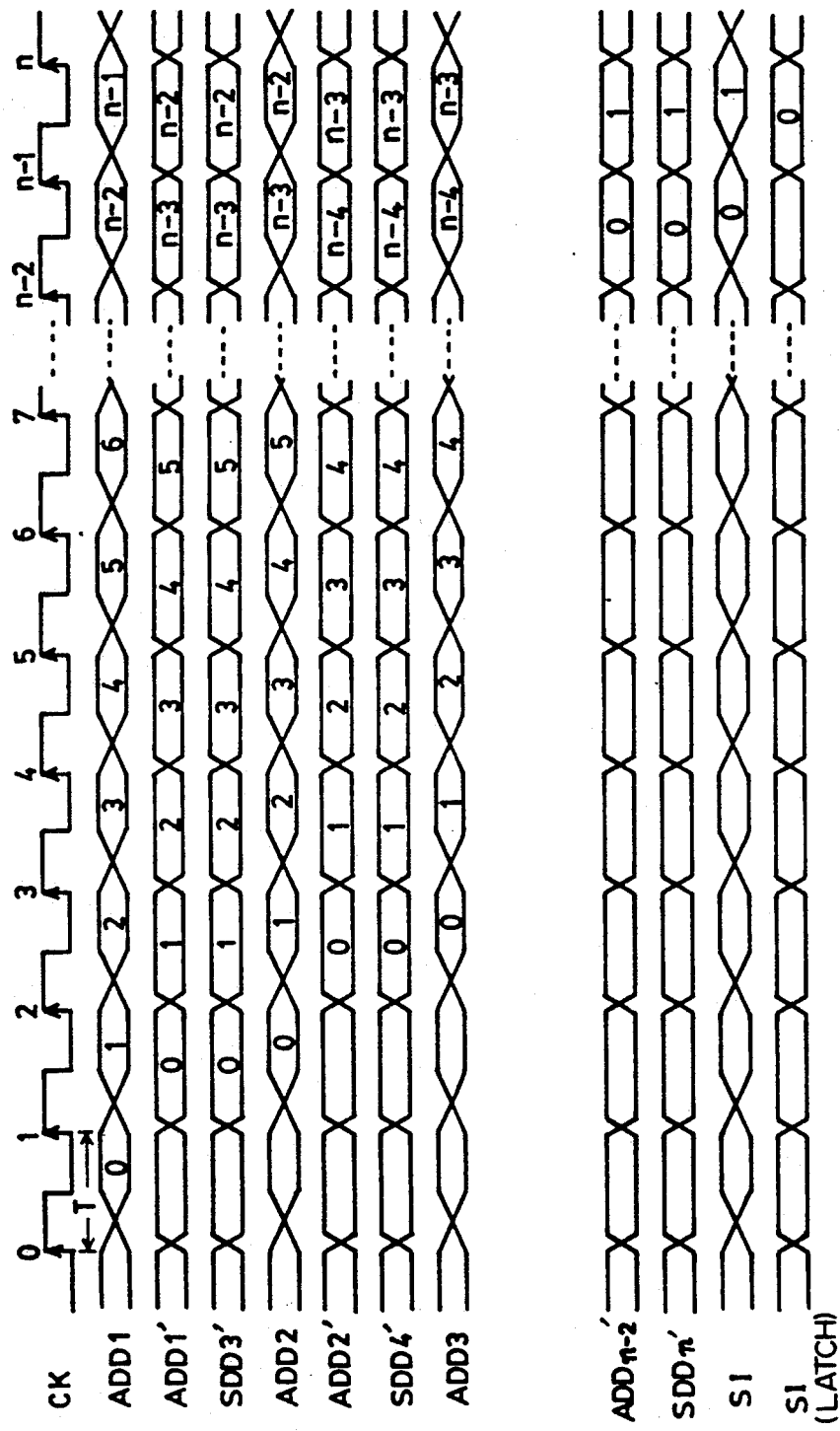
FIG. 7 is a timing chart for the adding means of FIG. 6.

FIG. 6 is a block diagram of typical adding means for use in the ultrasonic receiving apparatuses according to the second and the third aspects of the invention. FIG. 7 is a timing chart for the adding means of FIG. 6. In FIG. 7, numerals 0, 1, 2, etc. stand for pulses of the clock signal CK as well as for the signals sampled at the leading edge of each of the pulses 0, 1, 2, etc.

The adding means of FIG. 6 comprises a large number of adders 21(1), 21(2), ..., 21(n-1) and a large number of latch circuits 22(1), 22(2), ..., 22(n-2) for latching output signals from the adders 21(1), 21(2), ..., 21(n-2), the adders and the latch circuits being connected alternately in cascade fashion to form a sequential addition circuit 20. This adding means is also connected to a large number of delay circuits 23(3, 1), 23(4, 1), 23(4, 2), ..., 23(n, 1), 23(n, 2), ..., 23(n, n-2). These delay circuits delay each input signal by one cycle T of the clock signal CK.

Figure 18:
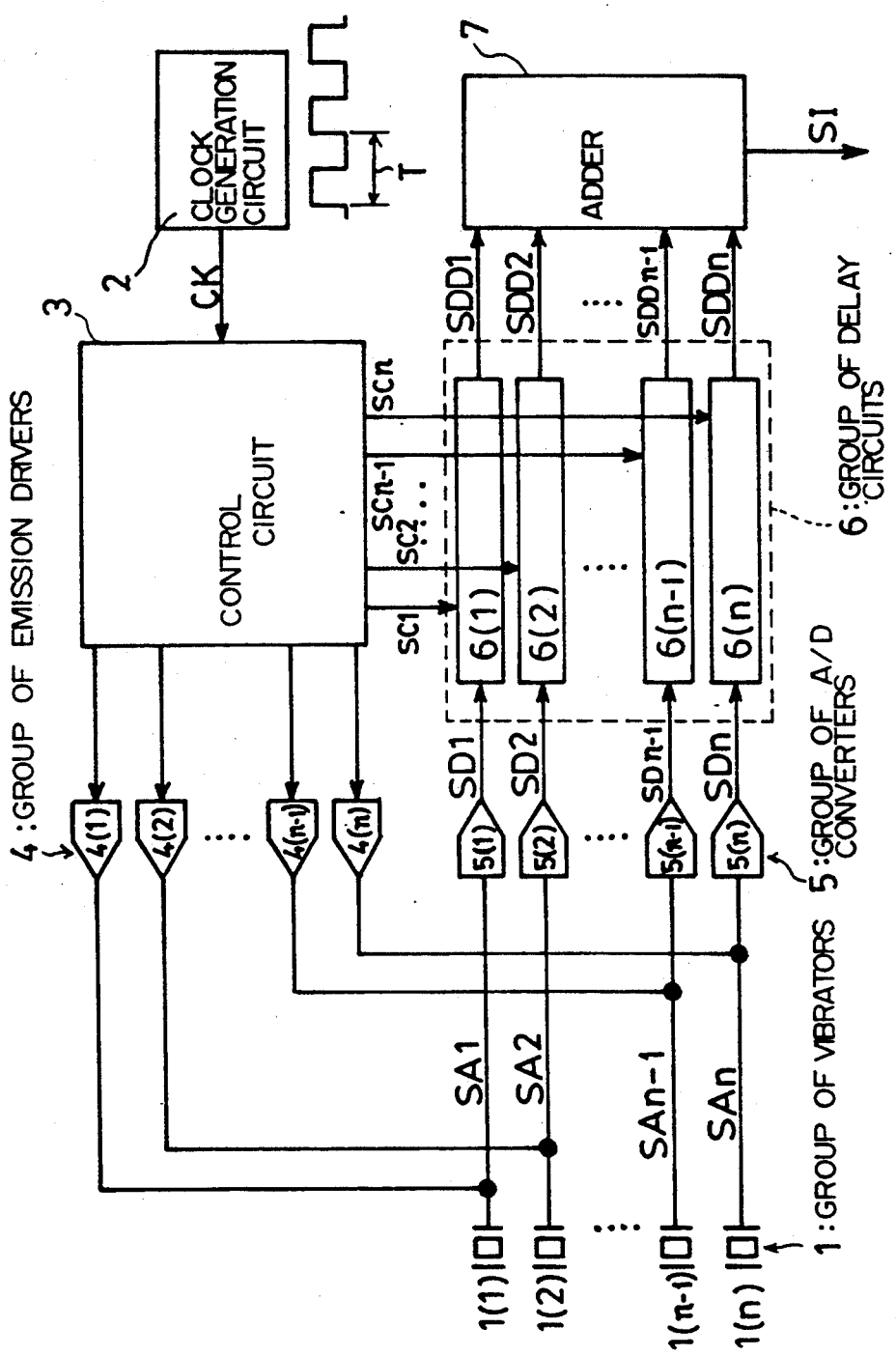
FIG. 18 is a circuit block diagram of a typical prior art ultrasonic diagnosis system.

Of the numerous digital reception signals SDD1, SDD2, SDD3, ..., SDDn (see FIG. 18) input simultaneously to this adding means, the signals SDD1 and SDD2 are input to the adder 21(1) in synchronism with the leading edge of pulse 0 (see FIG. 7). The adder 21(1) adds the signals SDD1 and SDD2 to form an addition signal ADD1. The signal ADD1 is input to and latched by the latch circuit 22(1). Concurrently, the other digital reception signals SDD3, SDD4, ..., SDDn are input to the delay circuits 23(3, 1), 23(4, 1), ..., 23(n, 1). In synchronism with the leading edge of pulse 1 of the clock signal CK, the adder 21(2) adds the output signal ADD1' from the latch circuit 22(1) and the digital reception signal SDD3' delayed by one clock pulse as it comes from the delay circuit 23(3, 1). The add operation produces an addition signal ADD2. The addition signal ADD2 is input to and latched by the latch circuit 22(2). Concurrently, the digital reception signals SDD4, ..., SDDn stored in the delay circuits 23(4, 1), ..., 23(n, 1) are shifted one place each to the delay circuits 23(4, 2), ..., 23(n, 2). The process is repeated so as to add up the digital reception signals SDD1, SDD2, ..., SDDn input simultaneously to the adding means, thereby producing an addition signal SI. The signal SI is sent to and latched by a latch circuit, not shown.

Figure 8:
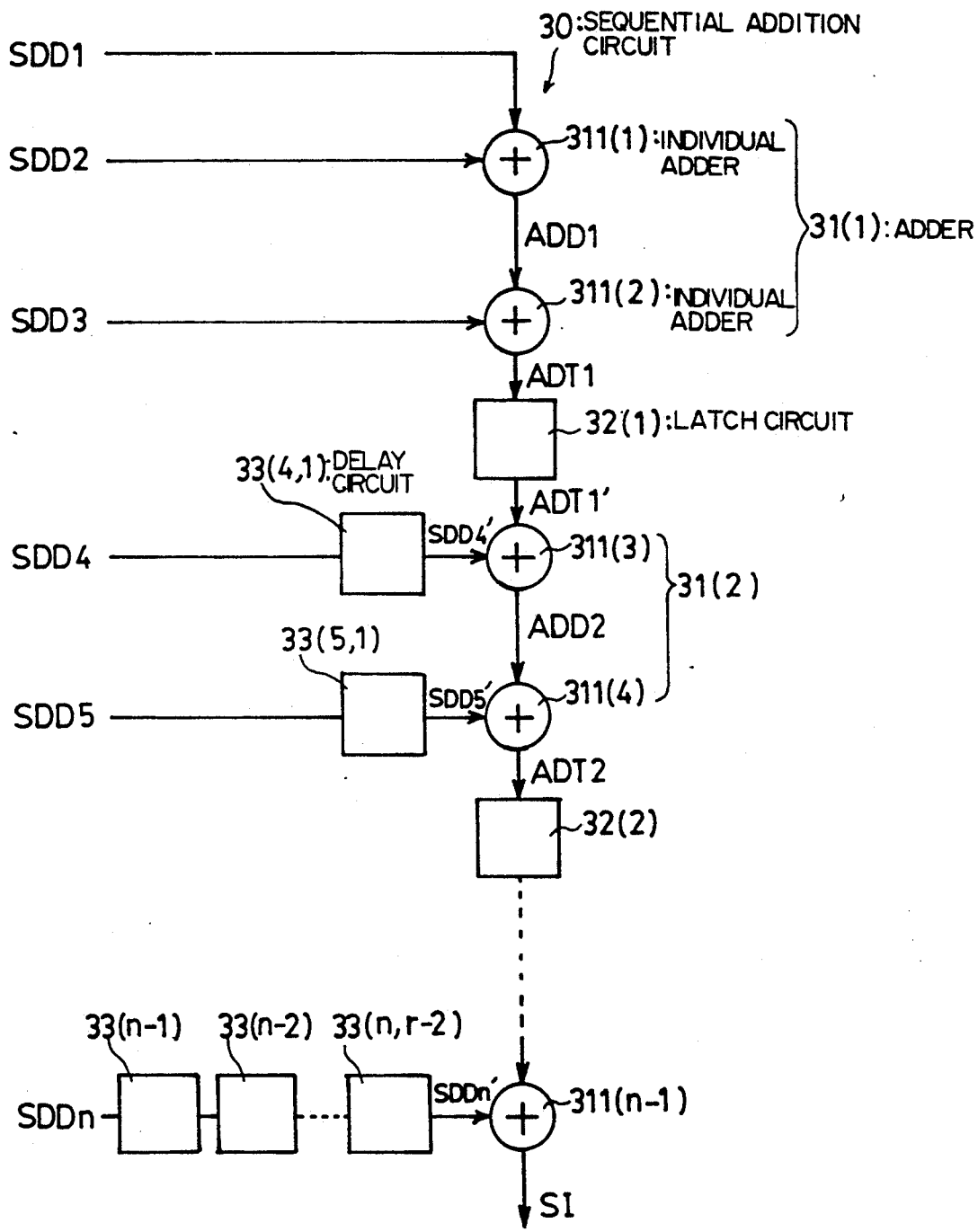
FIG. 8 is a block diagram of another adding means in connection with the invention.
Figure 9:
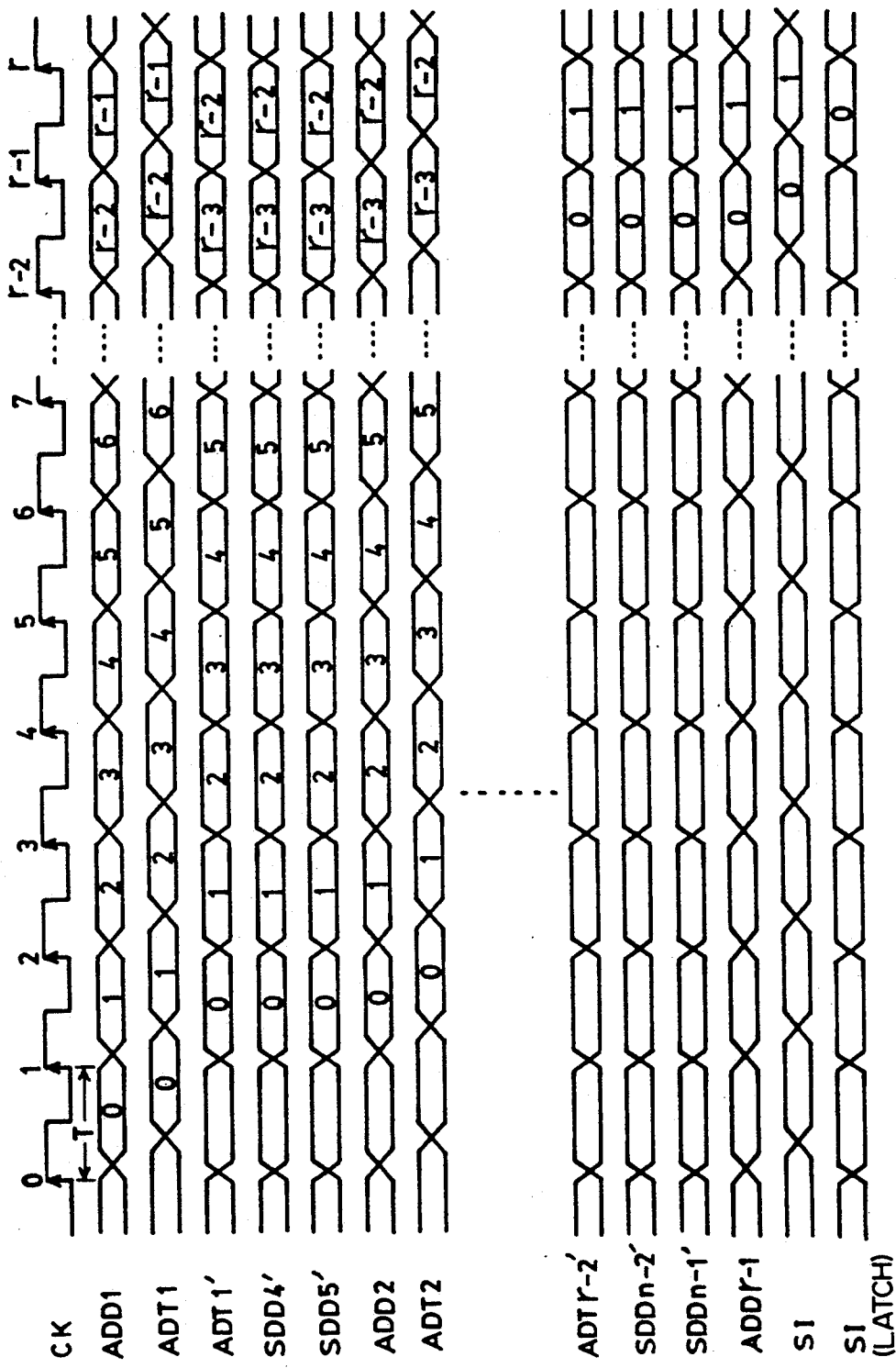
FIG. 9 is a timing chart for the adding means of FIG. 8.

FIG. 8 is a block diagram of another adding means in connection with the invention, and FIG. 9 is a timing chart for the adding means of FIG. 8. In the timing chart of FIG. 9, as in the case of FIG. 7, numerals 0, 1, 2, etc. stand for pulses of the clock signal CK as well a for the signals sampled at the leading edge of each of the pulses 0, 1, 2, etc.

In the adding means of FIG. 8, adders 31(1), 31(2), etc. are formed by combining every two of individual adders 311(1), 311(2), ..., 311(n-1). The adders 31(1), 31(2), etc. thus formed are connected to latch circuits 32(1), 32(2), etc., alternately in cascade fashion, whereby a sequential addition circuit 30 is constructed. The adding means also comprises a large number of delay circuits 33(4, 1), 33(5, 1), ..., 33(n, 1), 33(n, 2), ..., 33(n, r-2). These delay circuits, as with the adding means of FIG. 2, delay each input signal by one cycle T of the clock signal CK.

Of the numerous digital reception signals SDD1, SDD2, SDD3, ..., SDDn input simultaneously to this adding means, the signals SDD1 and SDD2 are input to the adder 311(1) in synchronism with the leading edge of pulse 0 (see FIG. 9). The adder 311(1) adds the signals SDD1 and SDD2 to form an addition signal ADD1. The signal ADD1 is input to and latched by the latch circuit 22(1). The signals ADD1 and SDD3 are input to the next adder 311(2) downstream, thereby producing an addition signal ADT1. The signal ADT1 is input to and latched by the latch circuit 32(1). Concurrently, the other digital reception signals SDD4, SDD5, ..., SDDn are input to the delay circuits 33(4, 1), 33(5, 1), ..., 33(n, 1). In synchronism with the leading edge of pulse 1 of the clock signal CK, the adder 311(3) adds the output signal ADT1' from the latch circuit 32(1) and the digital reception signal SDD4' delayed by one clock pulse as it comes from the delay circuit 33(4, 1). The add operation produces an addition signal ADD2. The addition signal ADD2 is added to the digital reception signal SDD5' output after a delay of one clock pulse by the delay circuit 33(5, 1), whereby an addition signal ADT2 is produced. The addition signal ADT2 is input to and latched by the latch circuit 32(2). Concurrently, the digital reception signals SDD6, ..., SDDn stored in the delay circuits 33(6, 1), ..., 33(n, 1) are shifted one place each to the delay circuits 33(6, 2), ..., 33(n, 2). The process is repeated so as to add up the digital reception signals SDD1, SDD2, ..., SDDn input simultaneously to the adding means, thereby producing an addition signal SI. The signal SI is sent to and latched by a latch circuit, not shown.

The quick operation rate of the individual adders 311(1), 311(2), ..., 311(n-1) allows each adder to perform a plurality of operations (twice in the example of FIG. 8) within one cycle T of the clock signal CK. Given this characteristic, a plurality of individual adders (2 adders in the example of FIG. 8) may be connected in cascade fashion upstream of each latch circuit. This construction needs fewer latch and delay circuits and affords quicker add operations than the setup in which each add operation is followed by a latch operation.

In the examples of FIGS. 6 and 8, each of the adders (individual adders) adds two digital reception signals. Alternatively, each adder may add three digital reception signals at once.

As depicted in FIGS. 6 and 8, add operations are sequentially carried out by use of the sequential addition circuit of adders and latch circuits connected in cascade fashion in combination with the numerous delay circuits to adjust the timings for adding the digital reception signals simultaneously input to the adding means. In this manner, larger probe arrangements are adequately addressed while add operations are carried out efficiently.

Figure 10:
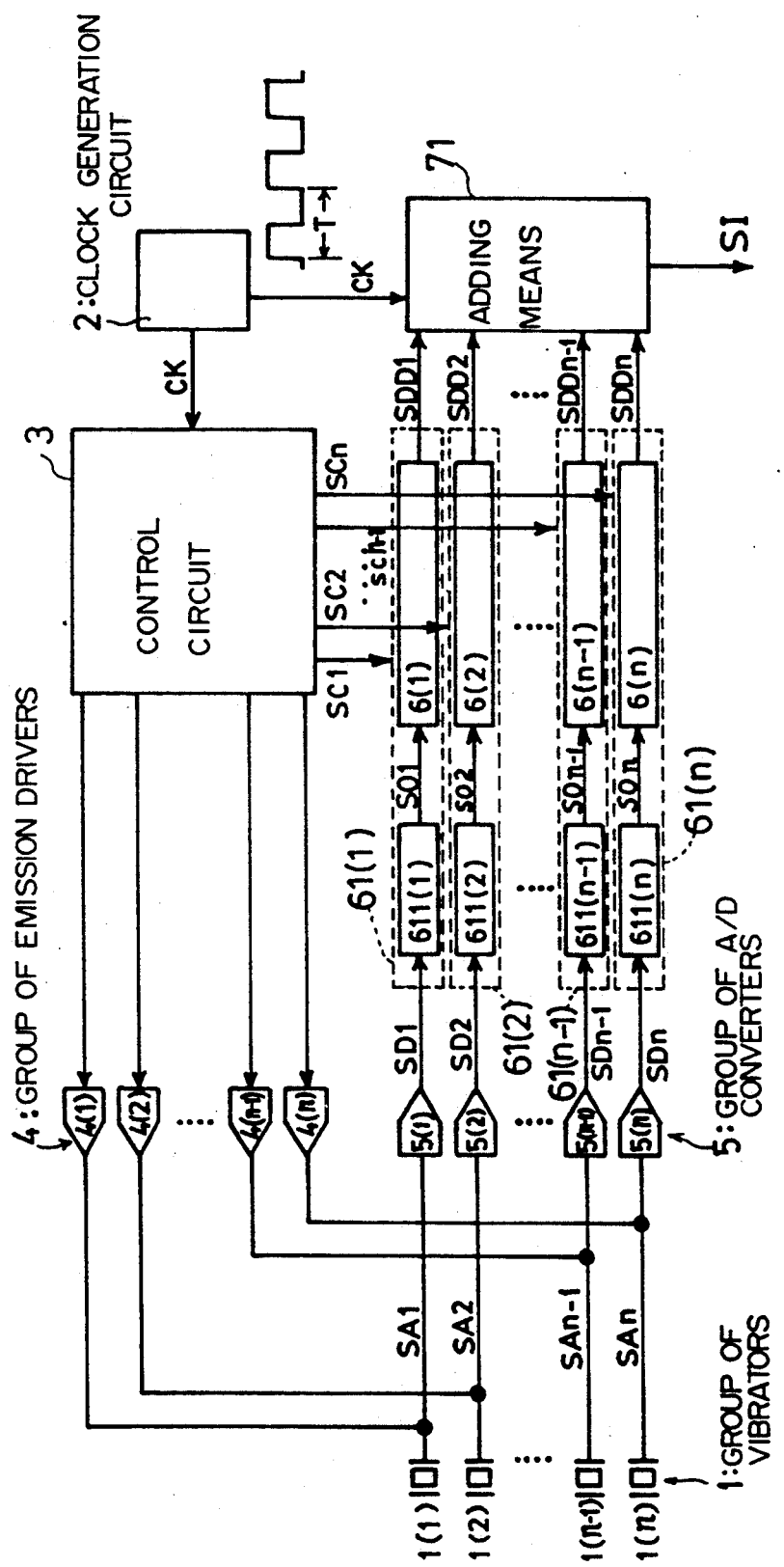
FIG. 10 is a circuit block diagram of an ultrasonic receiving apparatus embodying the third aspect of the invention.

FIG. 10 is a circuit block diagram of the ultrasonic receiving apparatus embodying the third aspect of the invention. In FIG. 10 as well as in FIG. 18, the latter being a circuit block diagram of the typical prior art ultrasonic diagnosis system, like reference numerals designate like or corresponding parts, and any repetitive description thereof will be omitted.

In the embodiment of FIG. 10, a large number of vibrators 1(1), 1(2), ..., 1(n) are matched with delaying means 61(1), 61(2), ..., 61(n). These delaying means are composed of the infinitesimal delay circuits 611(1), 611(2), ..., 611(n) in FIG. 2 or 4 and of the delay circuits 6(1), 6(2), ..., 6(n) of FIG. 18 for delays in units of the cycle T of the clock signal CK inside the prior art ultrasonic receiving apparatus. In this construction, the delaying means 61(1), 61(2), ..., 61(n) provide delays of high precision to satisfy two requirements: that reception signals be substantially matched with one another with respect to ten envelopes, and that the phase difference be within ±22.5°. These features permit dynamic focusing over a long range within the subject body. Adding means 71 receives the digital reception signals SDD1, SDD2, ..., SDDn which are output in phase by the delaying means 61(1), 61(2), ..., 61(n). The adding means 71 may be of the construction of FIG. 6 or of FIG. 8. In this setup, a large number of (e.g., 128) vibrators 1(1), 1(2), ..., 1(n) pose no problem in the efficient execution of add operations.

Figure 11:
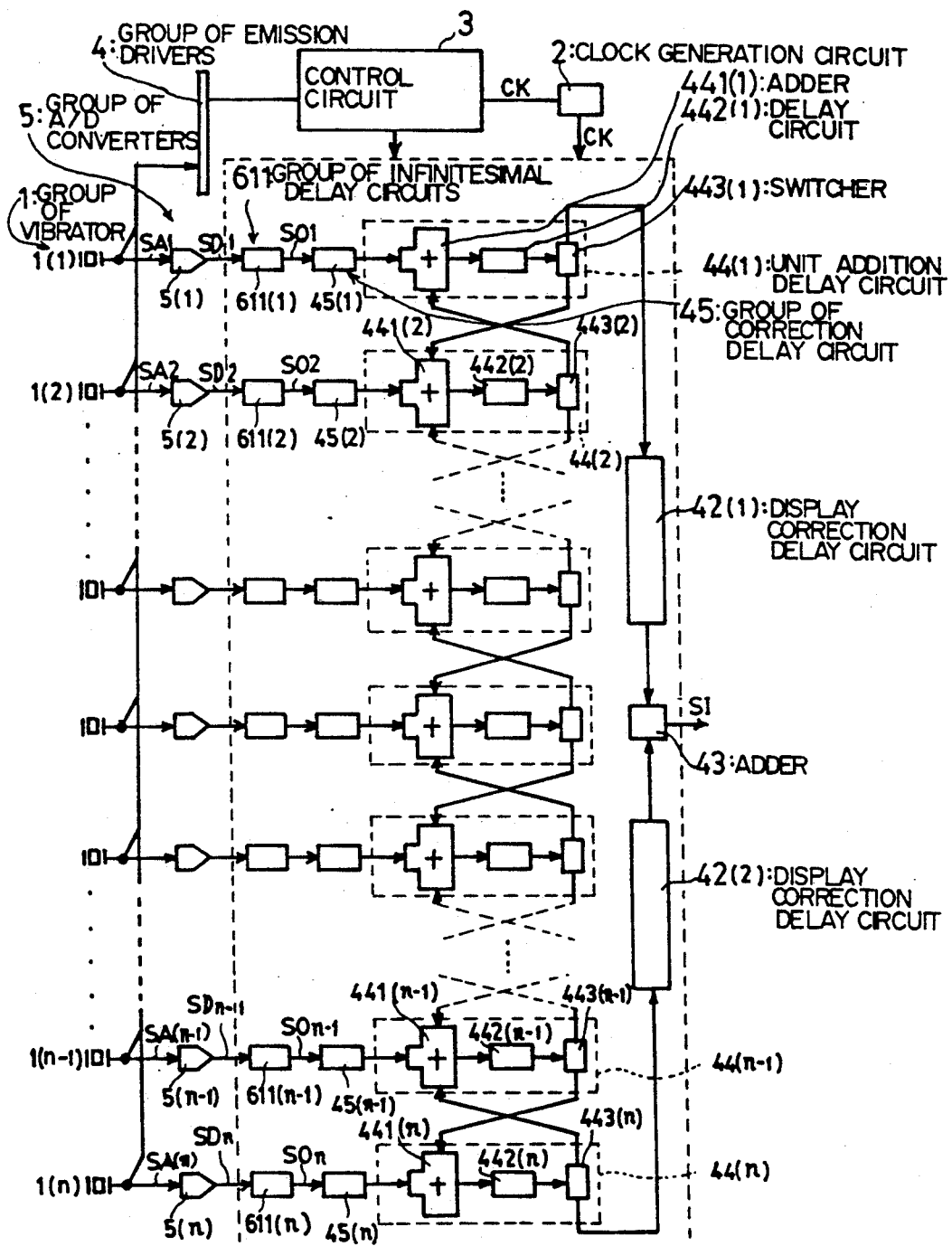
FIG. 11 is a circuit block diagram of an ultrasonic receiving apparatus embodying the fifth aspect of the invention.

FIG. 11 is a circuit block diagram of the ultrasonic receiving apparatus embodying the fifth aspect of the invention. In FIG. 11 as well as in FIG. 10, like reference numerals designate like or corresponding parts, and any repetitive description thereof will be omitted. It should be noted that simply removing the infinitesimal delay circuits 611(1), 611(2), ..., 611(n-1), 611(n) (making up the infinitesimal circuit group 611) illustratively from the setup of FIG. 10 or replacing these circuits with other known infinitesimal delay circuits provides the ultrasonic receiving apparatus embodying the fourth aspect of the invention. For this reason, the fourth embodiment will not be described independently and no independent circuit diagram thereof will be included herein.

Figure 19:
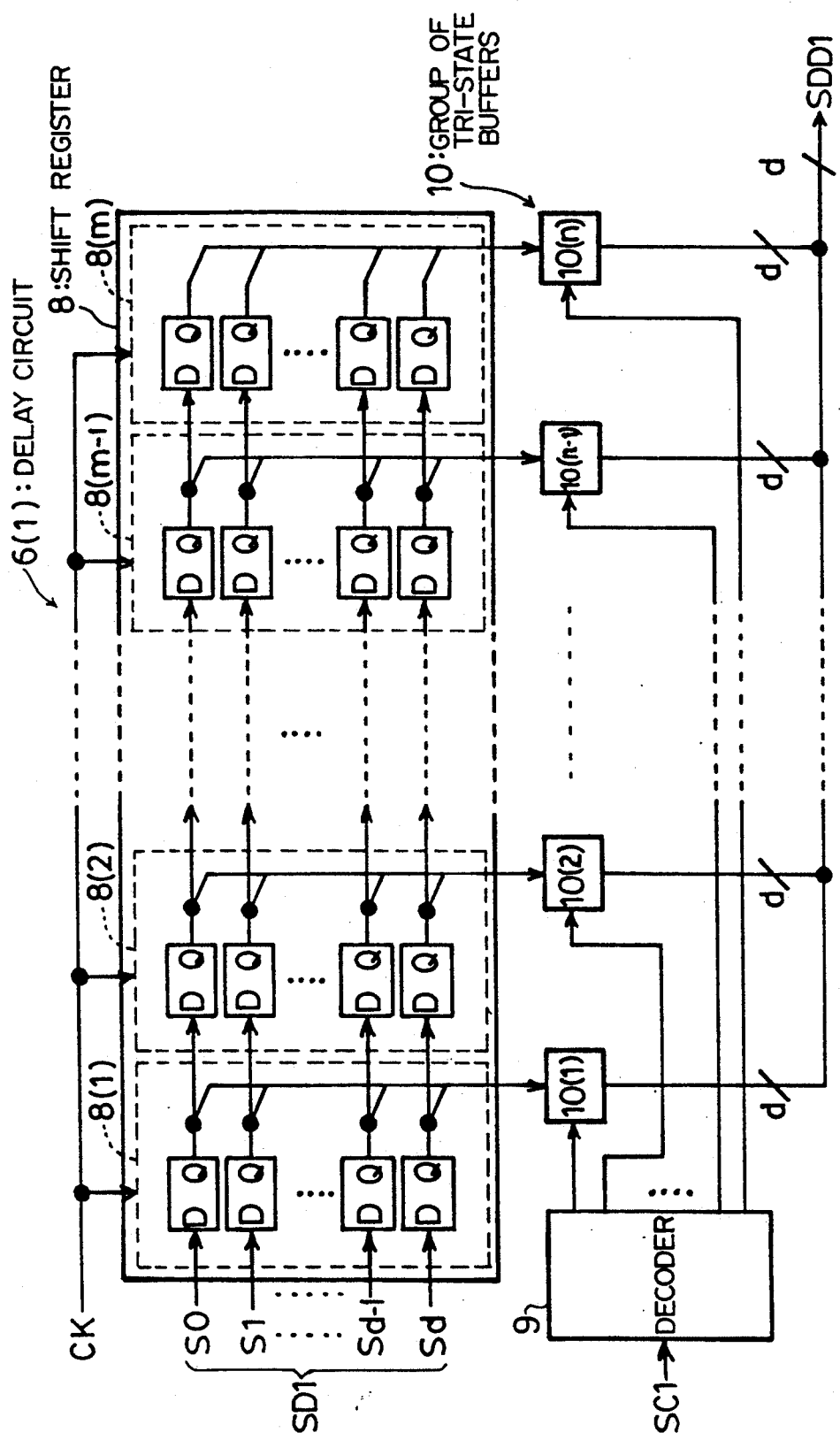
FIG. 19 is an internal block diagram of a delay circuit in connection with the invention.
Figure 20:
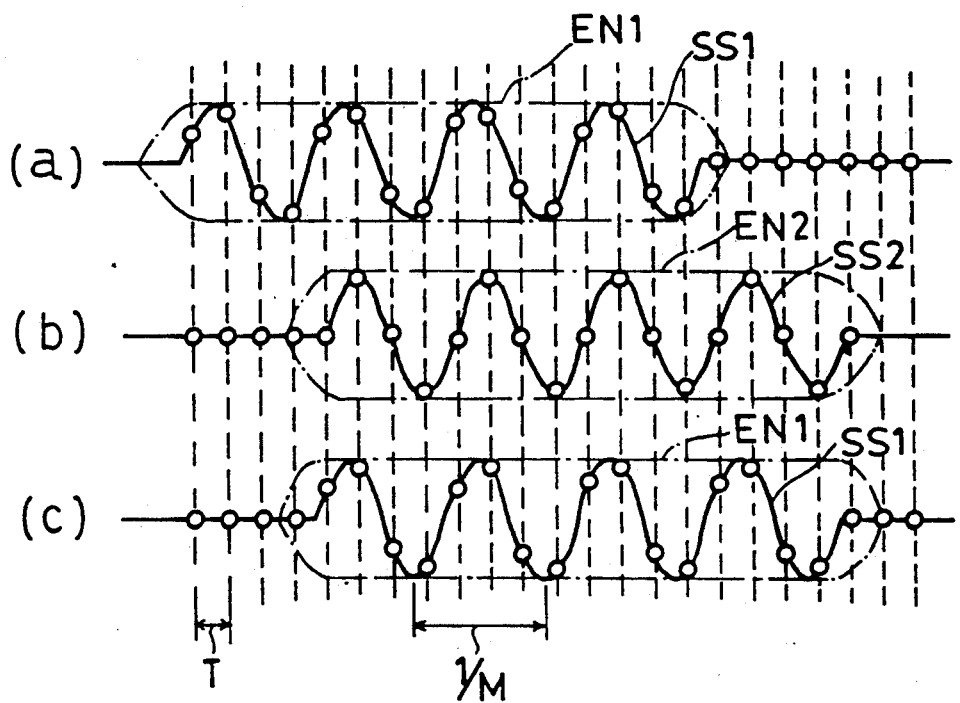
FIG. 20 is a schematic view of typical ultrasonic reception signals.

Each of n (e.g., 128) infinitesimal delay circuits 611(1), 611(2), ..., 611(n-1), 611(n) has the structure shown in FIG. 2 or 4. Downstream of these infinitesimal delay circuits, there are respectively provided correction delay circuits 45(1), 45(2), ..., 45(n-1), 45(n) forming a correction delay circuit group 45. Each of these correction delay circuits may use a shift register 8 shown in FIG. 19. That is, a correction delay circuit provides a delay in units of the cycle T of the clock signal CK, i.e., a delay by an integer multiple of the clock signal cycle T. The individual stages 8(1), 8(2), ..., 8(n) making up the shift register 8 correspond to the delay circuits 23(3, 1), 23(4, 1), ..., 23(n, n-2); 33(4, 1), 33(5, 1), ..., 33(n, r-2) of the above-described adding means (see FIGS. 6 and 8). Downstream of the correction delay circuits 45(1), 45(2), ..., 45(n-1), 45(n), there are respectively furnished unit addition delay circuits 44(1), 44(2), ..., 44(n-1), 44(n). As illustrated, these unit addition delay circuits respectively comprise adders 441(1), 441(2), ..., 441(n-1), 441(n); of delay circuits 442(1), 442(2), ..., 442(n-1), 442(n); and of switchers 443(1), 443(2), ..., 443(n-1), 443(n). As with the correction delay circuits 45(1), 45(2), ..., 45(n-1), 45(n), the delay circuits 442(1), 442(2), ..., 442(n-1), 442(n) illustratively have the circuit construction of FIG. 19. As such, each delay circuit is capable of delaying by an integer multiple of the cycle T of the clock signal CK. The switchers 443(1), 443(2), ..., 443(n 1), 443(n) select one of two output signals from each of the delay circuits 442(1), 442(2), ..., 442(n-1), 442(n). Of the large number of vibrators 1(1), 1(2), ..., 1(n-1), 1(n), those minus the two vibrators 1(1) and 1(n) at the opposite ends of the vibrator group correspond respectively to the unit addition delay circuits 44(2), 44(3), ..., 44(n-1). In turn, the unit addition delay circuits 44(2), 44(3), ..., 44(n-1) are constituted respectively by the delay circuits 442(2), 442(3), ..., 442(n). The outputs of these delay circuits are each connected via the switchers 443(2), 443(3), ...

, 443(n-1) to the two adjacent adders among 441(1), 441(2), ..., 441(n-1), 441(n) so that the output signal from one delay circuit (e.g., 442(2)) will be input to one of two adders (e.g., 441(1) or 441(3)). The output of the delay circuit 442(1) that constitutes par of the unit addition delay circuit 44(1) corresponding to the vibrator 1(1) at one vibrator group end is connected via the switcher 443(1) either to the adder 441(2) of the adjacent unit addition delay circuit 44(2), or to a display correction delay circuit 42(1). The output of the delay circuit 442(n) that constitutes part of the unit addition delay circuit 44(n) corresponding to the vibrator 1(n) at the other vibrator group end is connected via the switcher 443(n) either to the adder 441(n-1) of the adjacent unit addition delay circuit 44(n-1), or to a display correction delay circuit 42(2). The two display correction delay circuits 42(1) and 42(2) illustratively have the circuit construction of FIG. 19, as with the correction delay circuits 45(1), 45(2), ..., 45(n-1), 45(n) as well as the delay circuits 442(1), 442(2), ..., 442(n-1), 442(n). Each display correction delay circuit is capable of delaying by an integer multiple of the cycle T of the clock signal CK. The outputs of the display correction delay circuits 42(1) and 42(2) are input to an adder 43. The adder 43 in turn outputs a tomogram display signal SI.

In the delaying-adding means of FIG. 11, a control circuit 3 controls two kinds of factors: the delay amounts of digital reception signals SD1, SD2, ..., SDn-1, SDn produced through sampling by A/D converters 5(1), 5(2), ..., 5(n-1), 5(n); and the switching directions of switchers 443(1), 443(2), ..., 443(2), ..., 443(n-1), 443(n). This provides dynamic focusing of sufficiently high accuracy over a wide range within the subject body.

Below is a description of how the delaying-adding means of FIG. 11 works, with the number of vibrators limited to 8 for explanatory purposes. Since the workings of the infinitesimal delay circuits 611(1), 611(2), ..., 611(n-1), 611(n) have already been described, infinitesimal delays by these circuits will be omitted in the description that follows.

Figure 12:
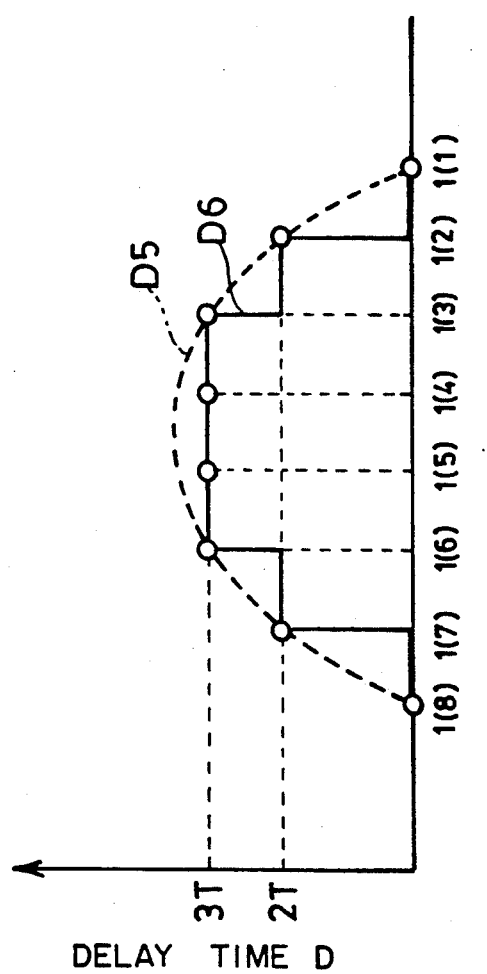
FIG. 12 is a view of a typical delay pattern in connection with the invention.

FIG. 12 is a view of a typical delay pattern formed by scanning lines near the screen center during linear and convex scanning passes. The horizontal axis of the figure represents eight vibrators 1(1), 1(2), ..., 1(8), and the vertical axis stands for the delay times D of reception signals obtained by these vibrators. Ideally, the reception signals acquired by the vibrators 1(1), 1(2), ..., 1(8) should be submitted to delays as per the broken line delay pattern D5 in FIG. 12. But here, the reception signals are delayed in units of the cycle T of the clock signal CK along the delay pattern D6 approximating the pattern D5.

Figure 13:
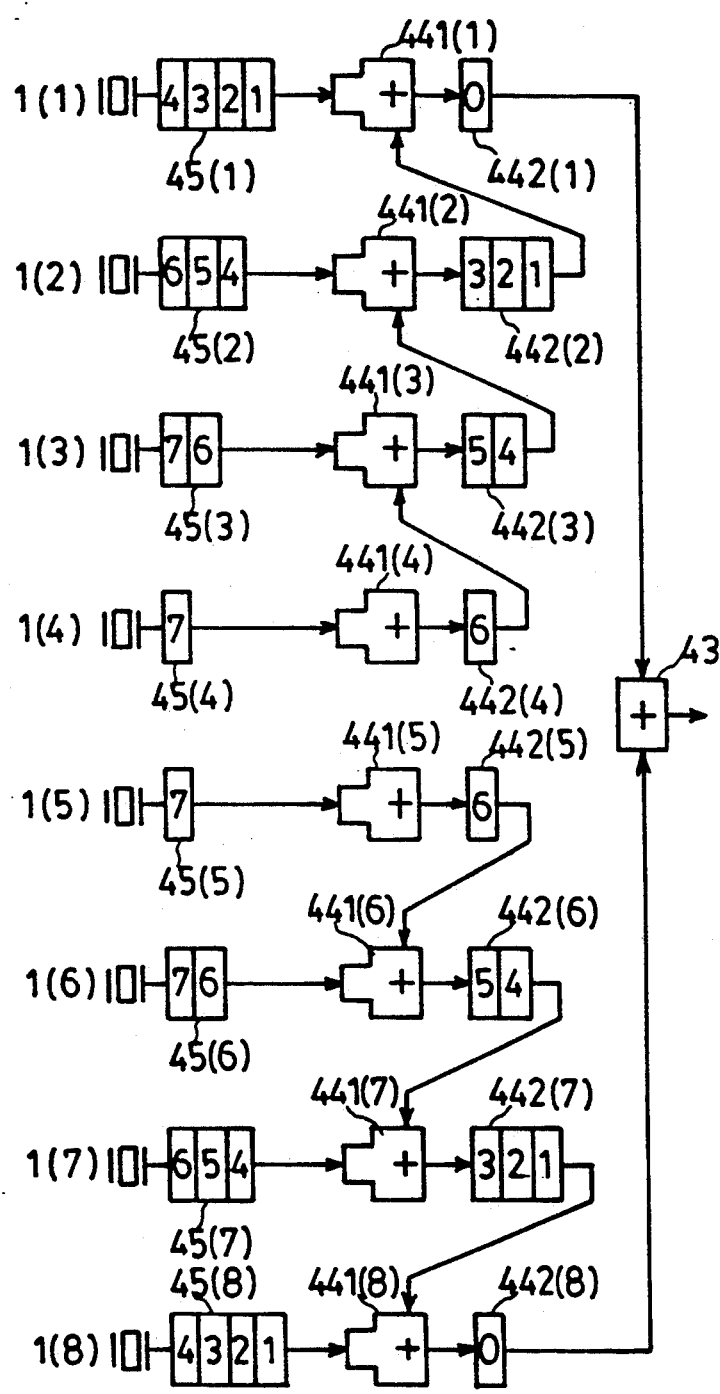
FIG. 13 is a view describing how the circuit of FIG. 11 illustratively works to implement the delay pattern of FIG. 12.

FIG. 13 is a diagram illustrating describing how the circuit of FIG. 11 works to implement the delay pattern D6 shown in FIG. 12. Referring to FIG. 13, the analog reception signals obtained by the vibrators 1(1), 1(2), ..., 1(8) are converted to digital reception signals by A/D converters, not shown. The digital reception signals enter the correction delay circuits 45(1), 45(2), ..., 45(8). In FIG. 13, each of the rectangles making up each of the correction delay circuits 45(1), 45(2), ..., 45(8) represents a delay of one clock pulse (cycle T) of the clock signal CK. For example, the digital reception signal entering the correction delay circuit 45(1) is delayed by four clock pulses (4 cycles) before being input to the adder 441(1). The signals coming out of the adders 441(1), 441(2), ..., 441(8) are input to the delay circuits 442(1), 442(2), ..., 442(8), respectively. Each of the rectangles making up each of these delay circuits also represents a single clock pulse delay. As illustrated in FIG. 13, the outputs of the delay circuits 442(1), 442(2), ..., 442(8) are input either to their respective adjacent adders via switchers, not shown, or to an adder 43 via display correction delay circuits, not shown.

In FIG. 13, the numeral in each of the rectangles making up the correction delay circuits 45(1), 45(2), ..., 45(8) as well as the delay circuits 442(1), 442(2), ..., 442(8) indicates a relative delay amount in units of the cycle T of the clock signal CK with respect to the timing of an add operation by the adder 43.

The correction delay circuits 45(1), 45(2), ..., 45(8) and the delay circuits 442(1), 442(2), ..., 442(8) provide delays by the clock pulses indicated by the numerals inside the rectangles making up each of these circuits, while the switchers control the flow of signals as illustrated. In this setup, as indicated by numerals 4, 6, 7, 7, 7, 7, 6 and 4 in the most upstream of the rectangles making up each of the correction delay circuits 45(1), 45(2), ..., 45(8), signal delays occur as follows: The reception signals obtained by the vibrators 1(2) and 1(7) adjacent to the vibrators 1(1) and 1(8) at both ends are delayed by two clock pulses relative to those obtained by the latter two vibrators; the reception signals obtained by the other vibrators 1(3), 1(4), 1(5) and 1(6) are delayed by three clock pulses relative to those obtained by the two vibrators at both ends. In this manner, the delay pattern D6 of FIG. 12 is complied with.

Although the display correction delay circuits 42(1) and 42(2) (see FIG. 11) are omitted from FIG. 13 because the discussion centered solely on the relative delays of the reception signals involved, these two circuits 42(1) and 42(2) may be included to offer two delays of the same amount for display timing adjustment.

Figure 14:
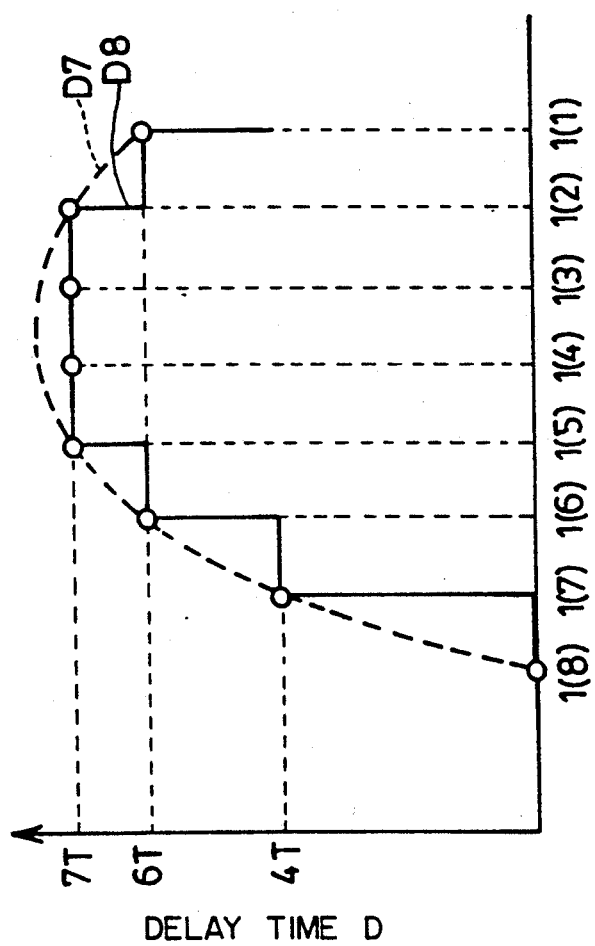
FIG. 14 is a view of another delay pattern in connection with the invention.

FIG. 14 is a view of another delay pattern formed by scanning lines near the screen center during linear and convex scanning passes, or by scanning lines in effect when the deflection angle is small during sector scanning. As in the case of FIG. 12, the horizontal axis of FIG. 14 represents eight vibrators 1(1), 1(2), ..., 1(8). and the vertical axis stands for the relative delay times D of reception signals obtained by these vibrators. The reception signals acquired by the vibrators 1(1), 1(2), ..., 1(8) are delayed as per the delay pattern D8 of FIG. 14 in units of the cycle T of the clock signal CK, the pattern D8 approximating the ideal delay pattern D7 in the figure.

Figure 15:
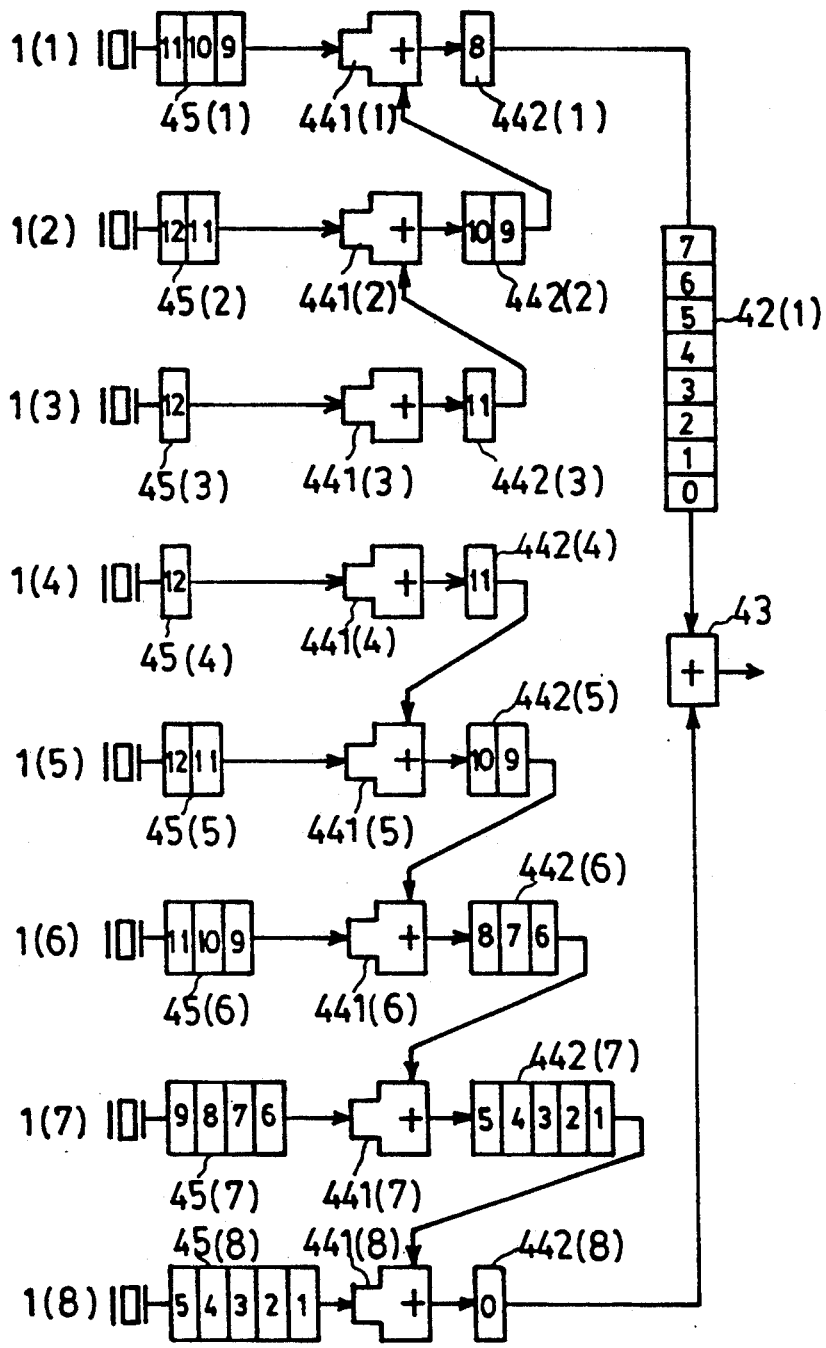
FIG. 15 is a view depicting how the circuit of FIG. 11 illustratively works to implement the delay pattern of FIG. 14.
Figure 16:
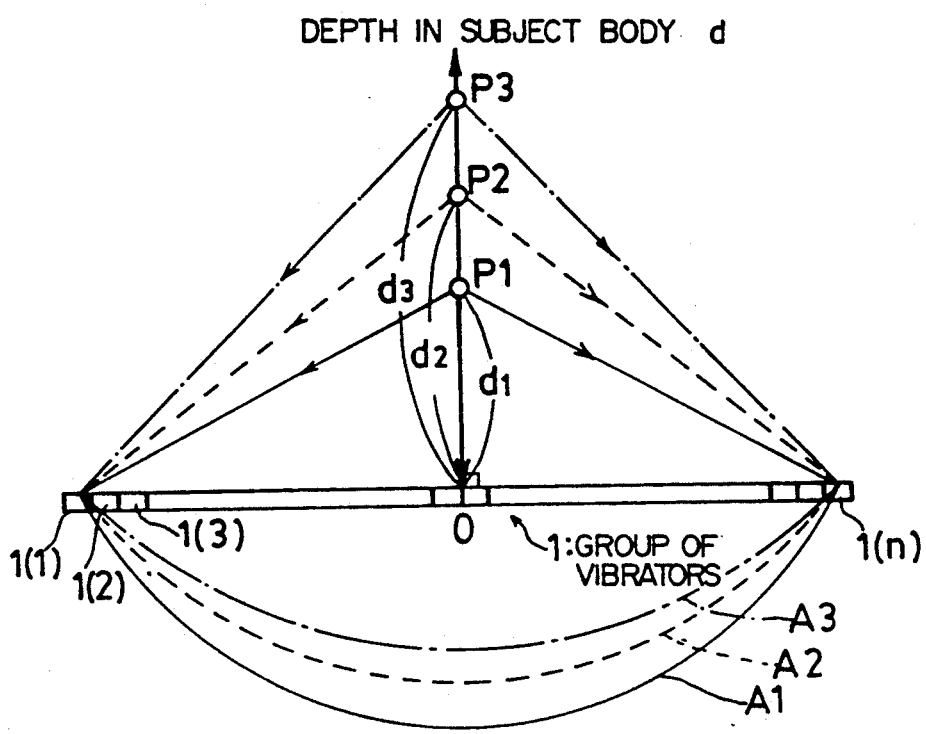
FIG. 16 is a schematic view showing the relationship between vibrators of the embodiment and points of ultrasonic reflection inside the subject body.
Figure 17:
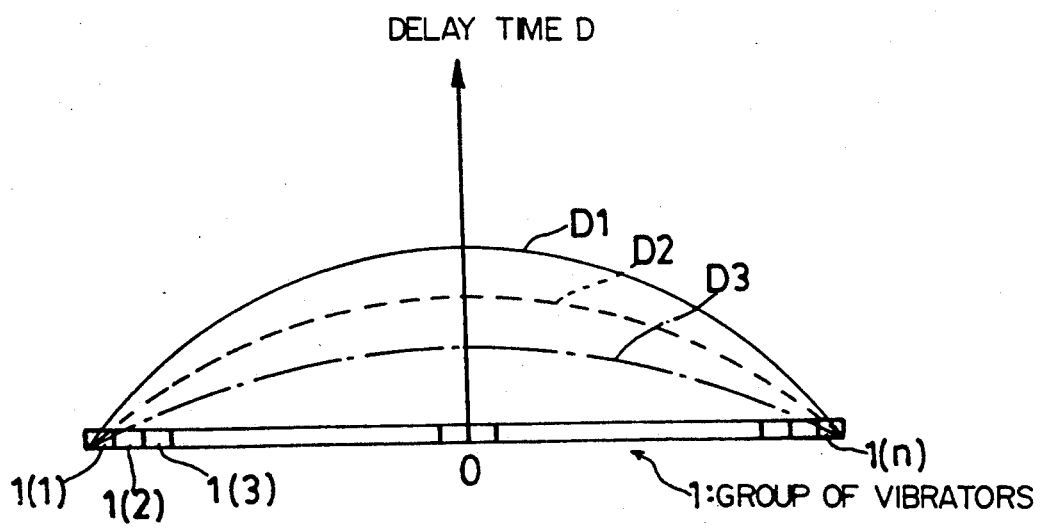
FIG. 17 is a schematic view indicating the relationship between the vibrators and delay times.

FIG. 15 is a view describing how the circuit of FIG. 11 illustratively works to implement the delay pattern of FIG. 14. Any description of those parts in FIG. 15 which are functionally identical to their counterparts in FIG. 13 will be omitted herein.

The correction delay circuits 45(1), 45(2), ..., 45(8), the delay circuits 442(1), 442(2), ..., 442(8) and the display correction delay circuit 42(1) provide delays by the clock pulses indicated by the numerals inside the rectangles making up each of these circuits, while switchers, not shown, control the flow of signals as illustrated. In this setup, as indicated by numerals 11, 12, 12, 12, 12, 11, 9 and 5 in the most upstream of the rectangles making up each of the correction delay circuits 45(1), 45(2), ..., 45(8), the reception signals obtained by the vibrators 1(2), ..., 1(7) are delayed respectively by 6, 7, 7, 7, 7, 6 and 4 clock pulses relative to the reception signal obtained by the vibrator 1(8). This allows the delay pattern D8 of FIG. 14 to be complied with.

As described, the delaying-adding means of FIG. 11 gets the control circuit 3 to control the delay amounts of various reception signals as well as the operation of the switchers. The resulting delay and add operations deal suitably with linear, convex or sector scanning. Because this delaying-adding means includes the infinitesimal delay circuits 611(1), 611(2), . . . , 611(n-1), 611(n), infinitesimal delays of sufficiently high accuracy are available with raising the frequency of the clock signal CK. In the delaying-adding means of FIG. 11, the infinitesimal delay circuits 611(1), 611(2), . . . , 611(n-1), 611(n) are furnished upstream of the correction delay circuits 45(1), 45(2), . . . , 45(n-1), 45(n), respectively. An alternative to this setup is to locate the infinitesimal delay circuits 611(1), 611(2), . . . , 611(n-1), 611(n) downstream of the correction delay circuits 45(1), 45(2), . . . , 45(n-1), 45(n), respectively.

While preferred embodiments of the invention have been described using specific terms, such description is for illustrative purposes only, and it is to be understood that changes and variations may be made without departing from the spirit or scope of the following claims.

What is claimed is:

1. An ultrasonic receiving apparatus comprising:
   a plurality of vibrators arranged in a predetermined direction for emitting ultrasonic waves into a subject body and receiving reflected ultrasonic waves therefrom so as to obtain analog reception signals;
   a clock generation circuit for generating a clock signal of a predetermined cycle;
   a plurality of analog-to-digital converters for receiving said analog reception signals from said vibrators, said analog-to-digital converters further converting said analog reception signals to digital reception signals at intervals of said predetermined cycle in order to output said digital reception signals;
   a plurality of delaying means having variable delay amounts for delaying said digital reception signals so as to output substantially simultaneously said digital reception signals representing the ultrasonic waves reflected substantially simultaneously at approximately the same point in said subject body; and
   adding means for adding said digital reception signals coming from said delaying means;
   each of said delaying means comprising a delay circuit and an infinitesimal delay circuit:
   said delay circuit delaying a digital reception signal of said digital reception signals by an integer multiple of said predetermined cycle;
   said infinitesimal delay circuit comprising:
   a multiplier for generating a multiplication signal through multiplication, by a first predetermined number, of said digital reception signal;
   a multiplication-delay circuit for generating a multiplication-delay signal through multiplication, by a second predetermined number, of said digital reception signal and through the delaying, by a predetermined time, of said digital reception signal; and
   a signal adder for adding said multiplication signal and said multiplication-delay signal.

2. An ultrasonic receiving apparatus according to claim 1, wherein said clock generation circuit generates a clock signal of which the frequency is four times the center frequency of said analog reception signals, and wherein said multiplication-delay circuit multiplies said digital reception signal by a second predetermined number and further delays said digital reception signal by one cycle of said clock signal.

3. An ultrasonic receiving apparatus comprising:
   a plurality of vibrators arranged in a predetermined direction for emitting ultrasonic waves into a subject body and receiving reflected ultrasonic waves therefrom so as to obtain analog reception signals;
   a clock generation circuit for generating a clock signal of a predetermined cycle;
   a plurality of analog-to-digital converters for receiving said analog reception signals from said vibrators, said analog-to-digital converters further converting said analog reception signals to digital reception signals at intervals of said predetermined cycle in order to output said digital reception signals;
   a plurality of delaying means having variable delay amounts for delaying said digital reception signals so as to output substantially simultaneously said digital reception signals representing the ultrasonic waves reflected substantially simultaneously a approximately the same point in said subject body; and
   adding means for adding said digital reception signals coming from said delaying means;
   said adding means including:
   a sequential addition circuit having adders and latch circuits connected in cascade fashion so that an output signal from one adder is latched by the latch circuit immediately downstream which in turn outputs the latched result to the next adder; and
   a plurality of delay circuits for delaying each of said digital reception signals by an integer multiple of said predetermined cycle for distribution to said adders, in such a manner that said digital reception signals will be added after being output simultaneously by said delaying means.

4. An ultrasonic receiving apparatus according to claim 3, wherein each of said adders comprises at least one individual adder for adding at least two digital reception signals.

5. An ultrasonic receiving apparatus comprising:
   a plurality of vibrators arranged in a predetermined direction for emitting ultrasonic waves into a subject body and receiving reflected ultrasonic waves therefrom so as to obtain analog reception signals;
   a clock generation circuit for generating a clock signal of a predetermined cycle;
   a plurality of analog-to-digital converters for receiving said analog reception signals from said vibrators, said analog-to-digital converters further converting said analog reception signals to digital reception signals at intervals of said predetermined cycle in order to output said digital reception signals; and
   delaying-adding means for delaying individually said digital reception signals output by said analog-to-digital converters so that said digital reception signals when added will represent the ultrasonic waves reflected substantially simultaneously at approximately the same point in said subject body;
   said delaying-adding means including a plurality of delaying means and adding means;
   each of said delaying means comprising a delay circuit and an infinitesimal delay circuit:

said delay circuit delaying a digital reception signal of said digital reception signals by an integer multiple of said predetermined cycle;

said infinitesimal delay circuit comprising:

a multiplier for generating a multiplication signal through multiplication, by a first predetermined number, of said digital reception signal;

a multiplication-delay circuit for generating a multiplication-delay signal through multiplication, by a second predetermined number, of said digital reception signal and through the delaying, by a predetermined time, of said digital reception signal; and a signal adder for adding said multiplication signal and said multiplication-delay signal;

said adding means including:

a sequential addition circuit having adders and latch circuits connected in cascade fashion so that an output signal from one adder is latched by the latch circuit immediately downstream which in turn outputs the latched result to the next adder; and a plurality of delay circuits for delaying each of said digital reception signals by an integer multiple of said predetermined cycle for distribution to said adders, in such a manner that said digital reception signals will be added after being output simultaneously by said delaying means.

6. An ultrasonic receiving apparatus comprising:

a plurality of vibrators arranged in a predetermined direction for emitting ultrasonic waves into a subject body and receiving reflected ultrasonic waves therefrom so as to obtain analog reception signals;

a clock generation circuit for generating a clock signal of a predetermined cycle;

a plurality of analog-to-digital converters for receiving said analog reception signals from said vibrators, said analog-to-digital converters further converting said analog reception signals to digital reception signals at intervals of said predetermined cycle in order to output said digital reception signals; and delaying-adding means for delaying individually said digital reception signals output by said analog-to-digital converters so that said digital reception signals when added will represent the ultrasonic waves reflected substantially simultaneously at approximately the same point in said subject body;

said delaying-adding means including:

a first and a second display correction delay circuit for delaying each input signal by an integer multiple of said predetermined cycle;

an adder for adding output signals from said first and said second display correction delay circuits;

a plurality of unit addition delay circuits corresponding to said vibrators except for the two vibrators at both ends of the vibrator group, each of said unit addition delay circuits comprising:

an adder for receiving a digital reception signal;

a delay circuit for latching an output signal from said adder for delay by an integer multiple of said predetermined cycle so as to allow the adder immediately downstream of said adder to add up the digital reception signals representing the ultrasonic waves reflected substantially simultaneously at approximately the same point in the subject body; and a switcher for switching an output signal from said delay circuit to one of the two adders corresponding to the two vibrators adjacent to each vibrator;

said delaying-adding means further including:

a unit addition delay circuit provided for the first of the two vibrators located at respective opposite ends of the group of said vibrators, said unit addition delay circuit comprising:

an adder for receiving a digital reception signal;

a delay circuit for latching an output signal from said adder for delay by an integer multiple of said predetermined cycle so as to allow the adder immediately downstream of said adder to add up the digital reception signals representing the ultrasonic waves reflected substantially simultaneously at approximately the same point in the subject body; and a switcher for switching an output signal from said delay circuit to one of two destinations, one destination being the first of said two vibrators, the other destination being said first display correction delay circuit;

said delaying-adding means further including:

a unit addition delay circuit provided for the second of the two vibrators located at respective opposite ends of the group of said vibrators, said unit addition delay circuit comprising:

an adder for receiving a digital reception signal;

a delay circuit for latching an output signal from said adder for delay by an integer multiple of said predetermined cycle so as to allow the adder immediately downstream of said adder to add up the digital reception signals representing the ultrasonic waves reflected substantially simultaneously at approximately the same point in the subject body; and a switcher for switching an output signal from said delay circuit to one of two destinations, one destination being the second of said two vibrators, the other destination being said second display correction delay circuit;

said delaying-adding means further including:

a plurality of correction delay circuits provided for each of said unit addition delay circuits, said correction delay circuits delaying each digital reception signal by an integer multiple of said predetermined cycle for distribution to each of said adders so that the digital reception signals input simultaneously to said delaying-adding means will be added up when the delay times of said delay circuits are the same.

7. An ultrasonic receiving apparatus according to claim 6, wherein said delaying-adding means further comprises a plurality of infinitesimal delay circuits, each of said infinitesimal delay circuits being positioned in one of two locations, one location being upstream of each correction delay circuit, the other location being downstream thereof, each of said infinitesimal delay circuits including:

a multiplier for generating a multiplication signal through multiplication, by a first predetermined number, of said digital reception signal;

a multiplication-delay circuit for generating a multiplication-delay signal through multiplication, by a second predetermined number, of said digital reception signal and through the delaying, by a predetermined time, of said digital reception signal; and a signal adder for adding said multiplication signal and said multiplication-delay signal.

* * * * *

UNITED STATES PATENT AND TRADEMARK OFFICE
CERTIFICATE OF CORRECTION

PATENT NO. : 5,217,017
DATED : June 8, 1993
INVENTOR(S) : MATSUSHIMA

It is certified that error appears in the above-indentified patent and that said Letters Patent is hereby corrected as shown below:

On the title page:

Item: Under [56] References Cited, insert the following:

FOREIGN PATENT DOCUMENTS

| | | |
|---|---|---|
| 3742724 | 12/1987 | Germany . |
| 0161587 | 11/1985 | European Pat. Off. . |
| 0388215 | 09/1990 | European Pat. Off. . |
| 0420346 | 04/1991 | European Pat. Off. . |
| 0451966 | 10/1991 | European Pat. Off. . |

Col. 3, line 14, after "(e.g.," insert --8--.

Col. 4, line 8, change "t e" to --the--.

Col. 5, line 31, change "mean" to --means--;
line 37, change "aperture" to --apertures--.

Col. 15, line 3, change "$2\pi f\tau = \omega\tau = \tau/2$" to --$2\pi f\tau = \omega\tau = \pi/2$--;
line 33, change "implement" to --implemented--.

Col. 19, line 54, delete "describing".

UNITED STATES PATENT AND TRADEMARK OFFICE
CERTIFICATE OF CORRECTION

PATENT NO. : 5,217,017
DATED : June 8, 1993
INVENTOR(S) : MATSUSHIMA

It is certified that error appears in the above-indentified patent and that said Letters Patent is hereby corrected as shown below:

Col. 24, line 6, after "respective" insert --,--.

Signed and Sealed this

Twenty-sixth Day of July, 1994

Attest:

BRUCE LEHMAN

Attesting Officer  Commissioner of Patents and Trademarks